United States Patent
Yeon et al.

(10) Patent No.: US 10,469,645 B2
(45) Date of Patent: Nov. 5, 2019

(54) METHOD AND APPARATUS FOR CREATING COMMUNICATION GROUP

(71) Applicant: Samsung Electronics Co., Ltd., Suwon-si, Gyeonggi-do (KR)

(72) Inventors: Jihyun Yeon, Hwaseong-si (KR); Geonsoo Kim, Suwon-si (KR); Jinhong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 471 days.

(21) Appl. No.: 14/619,466

(22) Filed: Feb. 11, 2015

(65) Prior Publication Data
US 2015/0237190 A1    Aug. 20, 2015

(30) Foreign Application Priority Data
Feb. 14, 2014  (KR) .................. 10-2014-0017452

(51) Int. Cl.
| | | |
|---|---|---|
| *G06F 3/00* | (2006.01) | |
| *H04M 1/725* | (2006.01) | |
| *G06Q 10/00* | (2012.01) | |
| *G06F 3/0484* | (2013.01) | |
| *H04M 3/56* | (2006.01) | |

(52) U.S. Cl.
CPC .... *H04M 1/72522* (2013.01); *G06F 3/04842* (2013.01); *G06Q 10/00* (2013.01); *H04M 3/563* (2013.01); *H04M 3/567* (2013.01)

(58) Field of Classification Search
CPC .. H04M 1/72522; H04M 3/563; H04M 3/567; G06F 3/04842; H04L 12/1813; H04L 12/1822; H04N 7/15
See application file for complete search history.

(56) References Cited

U.S. PATENT DOCUMENTS

| | | |
|---|---|---|
| 2009/0186605 A1 | 7/2009 | Apfel et al. |
| 2009/0239558 A1 | 9/2009 | Choi et al. |
| 2010/0203908 A1 | 8/2010 | Jeong et al. |

(Continued)

FOREIGN PATENT DOCUMENTS

| | | |
|---|---|---|
| CN | 101026612 A | 8/2007 |
| CN | 101478501 A | 7/2009 |

(Continued)

OTHER PUBLICATIONS

Chinese Office Action dated Mar. 19, 2019, issued in the Chinese Application No. 201580008429.8.

*Primary Examiner* — Xin Jia
(74) *Attorney, Agent, or Firm* — Jefferson IP Law, LLP

(57) ABSTRACT

A method of generating a communication group is provided. The method includes displaying a plurality of communication items generated based on a communication between a user and each of communication groups including at least one member, selecting at least a first communication item and a second communication item from the plurality of communication items based on a first user selection, selecting at least one group mode from a plurality of group modes based on a second user selection, and generating a third communication group based on the group mode, a first communication group corresponding to the first communication item, and a second communication group corresponding to the second communication item.

22 Claims, 37 Drawing Sheets

(56) References Cited

U.S. PATENT DOCUMENTS

| | | | |
|---|---|---|---|
| 2011/0258559 A1 | 10/2011 | You et al. | |
| 2012/0089924 A1* | 4/2012 | Weaver | H04L 12/1822 715/752 |
| 2013/0069969 A1* | 3/2013 | Chang | H04L 51/04 345/589 |
| 2013/0149989 A1* | 6/2013 | Kwon | H04W 4/08 455/404.2 |
| 2014/0024362 A1 | 1/2014 | Kang et al. | |
| 2014/0030978 A1 | 1/2014 | Kim et al. | |
| 2014/0173467 A1* | 6/2014 | Clavel | H04L 12/1822 715/758 |

FOREIGN PATENT DOCUMENTS

| | | |
|---|---|---|
| EP | 2 378 750 A1 | 10/2011 |
| EP | 2690845 A1 | 1/2014 |
| KR | 10-0637561 B1 | 10/2006 |
| KR | 10-2009-0104485 A | 10/2009 |
| KR | 10-2010-0091045 A | 8/2010 |
| WO | 2012/033243 A1 | 3/2012 |

* cited by examiner

440

METHOD AND APPARATUS FOR CREATING COMMUNICATION GROUP

CROSS-REFERENCE TO RELATED APPLICATION(S)

This application claims the benefit under 35 U.S.C. § 119(a) of a Korean patent application filed on Feb. 14, 2014 in the Korean Intellectual Property Office and assigned Serial number 10-2014-0017452, the entire disclosure of which is hereby incorporated by reference.

TECHNICAL FIELD

The present disclosure relates to a method and an apparatus for creating a communication group having electronic devices as members. More particularly, the present disclosure relates to a method and an apparatus for generating a new communication group by using communication items (for example, a chatting room, an address book, a message, notes, a call, an email, and the like) generated based on a communication between the user and a communication group including at least one members.

BACKGROUND

Portable electronic devices are used as electronic devices supporting a call function based on mobility in wide fields. As various communication networks have been recently developed, the use of messenger services capable of transmitting information between electronic devices in real-time has rapidly increased. For example, recent electronic devices provide, in various forms, not only a group chatting function by which at least two people can chat, but also communication based on at least one member, such as a group call, a mail, a message, and the like.

According to the related art, a user needed to select members one by one from a member list (for example, a contact list or a friend list) to generate a new group in order to use a communication function for at least one members, and thus the user may have found the process to be difficult.

Therefore, a need exists for a method and an apparatus for generating a new communication group by using communication items generated based on a communication between the user and a communication group including at least one members, so that user convenience may be improved.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for generating a new communication group by using communication items (for example, a chatting room, an address book, a message, notes, a call, an email, and the like) generated based on a communication between the user and a communication group including at least one member, so that user convenience may be improved.

In accordance with an aspect of the present disclosure, a method of generating a communication group is provided. The method includes displaying a plurality of communication items generated based on a communication between a user and each of communication groups including at least one member, selecting at least a first communication item and a second communication item from the plurality of communication items based on a first user selection, selecting at least one group mode from a plurality of group modes based on a second user selection, and generating a third communication group based on the group mode, a first communication group corresponding to the first communication item, and a second communication group corresponding to the second communication item.

In accordance with another aspect of the present disclosure, a communication device is provided. The communication device includes a communication module configured to support an operation of a communication function, a display module configured to display a plurality of communication items generated based on a communication between a user and a communication group including at least one member according to the operation of the communication function, and a processor configured to detect a first user selection for selecting a first communication item and a second communication item from the plurality of communication items, to detect a second user selection for selecting at least one group mode from a plurality of group modes, and to control generation of a third communication group based on the selected group mode, a first communication group corresponding to the first communication item, and a second communication group corresponding to the second communication item.

A method of generating a communication and an electronic device supporting the same according to various embodiments of the present disclosure can easily generate a communication group based on at least one member by using communication items (for example, a chatting room, an address book, messages, notes, a call, an email, and the like) generated based on at least one member.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
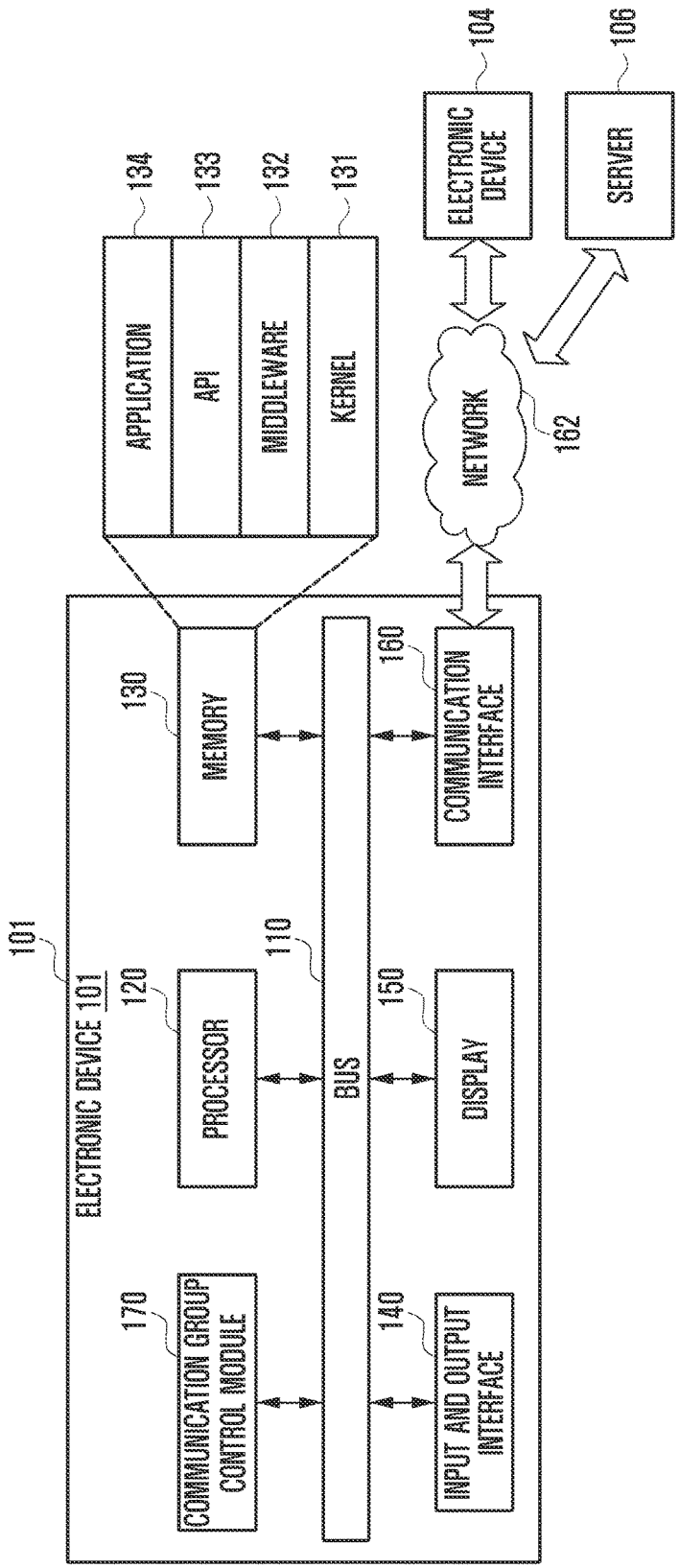
FIG. 1 is a diagram illustrating a network architecture including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "include" or "may include" refers to the existence of a corresponding function, operation, or element, and does not exclude one or more additional functions, operations, or elements. In addition, as used herein, the terms "include" and/or "have" should be construed to denote a certain feature, number, operation, element, component or a combination thereof, and should not be construed to exclude the existence or possible addition of one or more other features, numbers, operations, elements, components, or combinations thereof.

In addition, as used here, the expression "or" includes any or all combinations of words enumerated together. For example, the expression "A or B" may include A, may include B, or may include both A and B.

In the present disclosure, the expressions "a first", "a second", "the first", "the second", and the like may modify various elements, but the corresponding elements are not limited by these expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element without departing from the scope of the present disclosure.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The terms used herein are used only to describe particular embodiments, and are not intended to limit the present disclosure.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

In various embodiments of the present disclosure, a "communication item" may be understood as communication contents created based on one or more members. For example, the communication item may include at least one of a chatting room, address book, note, communication and email. A "communication item list" may be understood as a list in which communication items are arranged. For example, the communication item list may include at least one of a chatting room list, address book list, message list, note list, call list, and email list.

In various embodiments of the present disclosure, a "movement object" may be understood as one or more communication items which can be selected or moved from the communication list including communication items or movable information visually separated. The movement object may be displayed with at least one of a shape, size, color and effect different from those of the communication items, so as to be distinguished from the communication items.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group (MPEG-1 or MPEG-2) Audio Layer 3 (MP3) player, a mobile medical device, a camera, a wearable device (for example, a Head-Mounted-Device (HMD), such as electronic glasses), electronic clothes, an electronic bracelet, an electronic necklace, an electronic accessory, an electronic tattoo, and a smart watch.

According to various embodiments of the present disclosure, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, Television (TV) boxes (e.g., HomeSync™ of Samsung, Apple TV™, or Google TV™), game consoles, electronic dictionaries, electronic keys, camcorders, electronic frames, and the like.

According to various embodiments of the present disclosure, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to various embodiments of the present disclosure, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Further, it is obvious to those skilled in the art that the electronic device according to the present disclosure is not limited to the aforementioned devices.

Hereinafter, the electronic device according to various embodiments of the present disclosure will be described with reference to the accompanying drawings. The term "user" used in various embodiments of the present disclosure may refer to a person who uses an electronic device or a device (for example, an artificial intelligence electronic device) that uses an electronic device.

FIG. 1 is a diagram illustrating a network architecture including an electronic device according to various embodiments of the present disclosure.

Referring to FIG. 1, an electronic device 101 may include a bus 110, a processor 120, a memory 130, an input/output interface 140, a display 150, a communication interface 160, and a communication group control module 170.

The bus 110 may be a circuitry which connects the aforementioned components to each other to communicate signals (e.g., control messages) therebetween.

The processor 120 receives a command from any of the aforementioned components (e.g., the memory 130, the input/output interface 140, the display 150, the communication interface 160, and the communication group control module 170) through the bus 110, interprets the command, and executes operation or data processing according to the decrypted command.

The memory 130 may store the command or data received from the processor 120 or other components (e.g., the input/output interface 140, the display 150, the communication interface 160, the communication group control module 170, and the like) or generated by the processor 120 or other components. The memory 130 may store program modules including a kernel 131, a middleware 132, an Application Programming Interface (API) 133, applications 134, and the like. Each programming module may be implemented as software, firmware, hardware, and any combination thereof.

The kernel 131 may control or manage the system resources (e.g., the bus 110, the processor 120, and the memory 130) for use in executing the operation or function implemented with the middleware 132, the API 133, or the application 134. The kernel 131 also may provide an interface allowing the middleware 132, API 133, or application 134 to access the components of the electronic device 101 to control or manage.

The middleware 132 may work as a relay of data communicated between the API 133 or application 134 and the kernel 131. The middle 132 may execute control of the task requests from the applications 134 in such a way of assigning priority for use of the system resource (e.g., the bus 110, the processor 120, and the memory 130) of the electronic device to at least one of the applications 134.

The API 133 is the interface for the applications 134 to control the function provided by the kernel 131 or the middleware 132 and may include at least one interface or function (e.g., a command) for a file control, a window control, an image control, a text control, and the like.

According to various embodiments of the present disclosure, the applications 134 may include Short Messaging Service (SMS)/Multimedia Messaging Service (MMS) application, email application, calendar application, alarm application, health care application (e.g., application of measuring quantity of motion or blood sugar level), and environmental information application (e.g., atmospheric pressure, humidity, and temperature applications). Additionally or alternatively, the application 134 may be an application related to information exchange between the electronic device 101 and other external electronic device (e.g., an external electronic device 104). Examples of the information exchange application may include a notification relay application for relaying specific information to the external electronic device 104 and a device management application for managing the external electronic device.

For example, the notification relay application may be provided with a function of relaying the alarm information generated by the other applications (e.g., SMS/MMS application, email application, health care application, and environmental information application) of the electronic device to an external electronic device (e.g., the external electronic device 104). Additionally or alternatively, the notification relay application may provide the user with the notification information received from an external electronic device (e.g., the external electronic device 104). The electronic device application may manage (e.g., install, delete, and update) the function of an external electronic device (e.g., turn-on/off of the external electronic device 104 itself (or a part of it) or adjustment of the brightness (or resolution) of the display) which communicates with the electronic device 101 or the service (e.g., communication or messaging service) provided by the external electronic device or an application running on the external device.

According to various embodiments of the present disclosure, the applications 134 may include an application designated according to the property (e.g., a type) of an external electronic device (e.g., the external electronic device 104). If the external electronic device is the MP3 player, the applications 134 may include a music playback application. Similarly, if the external electronic device is a mobile medical appliance, the applications 134 may include a health care application. According to an embodiment of the present disclosure, the application 134 may include at least one of applications designated to the electronic device 101 or the applications received from the external electronic device (e.g., a server 106, the external electronic device 104, and the like).

The input/output interface 140 delivers the command or data input by the user through with an input/output device (e.g., sensor, keyboard, and touchscreen) to the processor 120, memory 130, communication interface 160, and/or communication group control module 170 through the bus 110. For example, the input/output interface 140 may provide the processor 120 with the data corresponding to the touch may by the user on the touchscreen. The input/output interface 140 may output the command or data (which is received from the processor 120, memory 130, communication interfaced 160, or the communication group control module 170 through the bus 110) through the input/output device (e.g., speaker and display). For example, the input/out interface 140 may output the voice data processed by the processor 120 to the user through the speaker.

The display 150 may present various information (e.g., multimedia data and text data) to the user.

The communication interface 160 may establish a communication connection of the electronic device 101 with an external device (e.g., the external electronic device 104, the server 106, and the like). For example, the communication interface 160 connects to a network 162 through a wireless or wired link for communication with the external device. Examples of the wireless communication technology may include wireless fidelity (Wi-Fi), Bluetooth (BT), Near Field Communication (NFC), GPS, and cellular communication technology (e.g., Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

According to an embodiment of the present disclosure, the network 162 may be a telecommunication network. The communication network may include at least one of computer network, Internet, Internet of Things, and telephone network. According to an embodiment of the present disclosure, the communication protocol between the electronic device 101 and an external device (e.g., transport layer protocol, data link layer protocol, and physical layer protocol) may be supported by at least one of the applications 134, API 133, middleware 132, kernel 131, and communication interface 160.

The communication group control module 170 may process at least some pieces of information acquired from other components (for example, the processor 120, the memory 130, the input/output interface 140, or the communication interface 160), and may provide the processed information to a user through various methods. For example, the communication group control module 170 may control at least some of the functions of the electronic device 101 by using the processor 120 or independently from the processor 120 such that the electronic device 101 interworks with another electronic device (for example, the external electronic device 104, the server 106, and the like).

When an input corresponding to selecting a first communication item is recognized in the communication list screen, the communication group control module 170 may output a movement object related to the selected first communication item, and select a second communication item according to the movement of the movement object and an area which overlaps at least another communication item.

The communication group control module 170 may store records of communication items generated based on one or more members in an order of time series or character strings. The communication group control module 170 may make a control to output a communication list screen including the one or more stored communication items to the display module 150 according to a user control or a certain schedule.

When two or more communication items are selected from the communication item list to generate a group, the communication group control module 170 may select information on members of a new group by using information on members included in the selected communication items.

The communication group control module 170 may generate one of an intersection communication group or a union communication group by using the members of the two or more communication items based on an input signal input from a user input module.

The communication group control module 170 may display the movement object or the selected communication items with at least one of a shape, size, color, and effect different from those of communication items which are not selected, in order to make clear distinctions between the items.

The communication group control module 170 may recognize a movement of a first input for selecting a first communication item in a chatting list screen, output one of group mode items above a second communication item according to the movement of the first input, and select a group mode corresponding to the output group mode item when release of the first input is recognized in a state where the group mode item is output.

The communication group control module 170 may recognize multiple inputs for selecting two communication items in the chatting list screen, select a group mode according to movement of the multiple inputs, and select members of two communication items selected by the multiple inputs according to the selected group mode.

The communication group control module 170 may further display information on selected members according to the group mode.

The communication group control module 170 may recognize a movement of an input for selecting two or more communication items, and may add or exclude members included in a communication group according to a direction of the recognized movement.

When an overlapping area between a movement object corresponding to the first communication item and the second communication item is within a range, the communication group control module 170 may select information on intersection members between the selected first communication item and the second communication item. When the overlapping area between the movement object and the second communication item exceeds the range, the communication group control module 170 may select information on union members between the first communication item and the second communication item.

Based on movement of the movement object corresponding to the first communication item, the first communication item and the second communication item may determine priorities of the communication items onto which the movement object is superposed, and select the second communication item.

Hereinafter, a communication group generating method will be described with reference to FIGS. 3 to 13.

Figure 2:
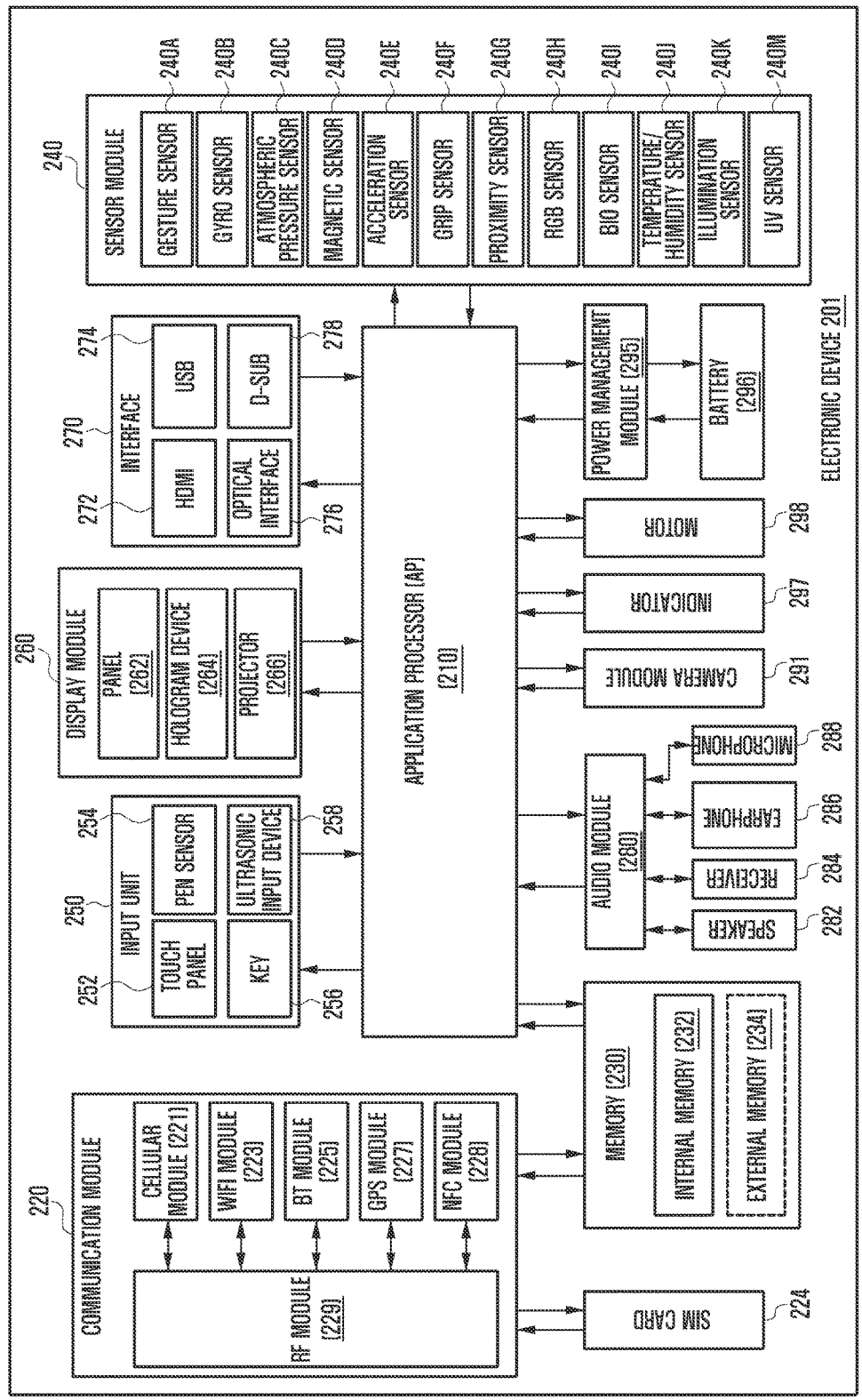
FIG. 2 is a block diagram illustrating a configuration of an electronic device according to various embodiments of the present disclosure.

FIG. 2 is a block diagram illustrating a configuration of an electronic device according to various embodiments of the present disclosure. The electronic device 201 may be of the whole or a part of the electronic device 101.

Referring to FIG. 2, an electronic device 201 may include an Application Processor (AP) 210, a communication module 220, a Subscriber Identity Module (SIM) card 224, a memory 230, a sensor module 240, an input device 250, a display module 260, an interface 270, an audio module 280, a camera module 291, a power management module 295, a battery 296, an indicator 297, and a motor 298. The AP 210 may operate an Operating System (OS) and/or application programs to control a plurality of hardware and/or software components connected to the AP 210 and perform data-processing and operations on multimedia data. For example, the AP 210 may be implemented in the form of System on Chip (SoC). According to an embodiment of the present disclosure, the AP 210 may include a Graphic Processing Unit (GPU) (not shown).

The communication module 220 (e.g., the communication interface 160) may perform data communication with other electronic devices (e.g., the external electronic device 104, the server 106, and the like) through a network. According to an embodiment of the present disclosure, the communication module 220 may include a cellular module 221, a Wi-Fi module 223, a BT module 225, a GPS module 227, an NFC module 228, and a Radio Frequency (RF) module 229.

The cellular module 221 is responsible for voice and video communication, text messaging, and Internet access services through a communication network (e.g., LTE, LTE-A, CDMA, WCDMA, UMTS, WiBro, and GSM networks). The cellular module 221 may perform identification and authentication of electronic devices in the communication network using the SIM card 224. According to an embodiment of the present disclosure, the cellular module 221 may perform at least one of the functions of the AP 210. For example, the cellular module 221 may perform at least a part of the multimedia control function.

According to an embodiment of the present disclosure, the cellular module 221 may include a Communication Processor (CP). The cellular module 221 may be implemented in the form of SoC. Although the cellular module 221 (e.g., a CP), the memory 230, and the power management module 295 are depicted as independent components separated from the AP 210, the present disclosure is not limited thereto but may be embodied in a way that the AP includes at least one of the components (e.g., cellular module 221).

According to an embodiment of the present disclosure, each of the AP 210 and the cellular module 221 (e.g., a CP) may load a command or data received from at least one of the components on a non-volatile or volatile memory and process the command or data. The AP 210 or the cellular module 221 may store the data received from other components or generated by at least one of other components in the non-volatile memory.

Each of the Wi-Fi module 223, the BT module 225, the GPS module 227, and the NFC module 228 may include a processor for processing the data it transmits/receives. Although the cellular module 221, the Wi-Fi module 223, the BT module 225, the GPS module 227, and the NFC module 228 are depicted as independent blocks, at least two of them (e.g., a CP corresponding to the cellular module 221 and Wi-Fi processor corresponding to the Wi-Fi module 223) may be integrated in the form of SoC. The RF module 229 is responsible for data communication, e.g., transmitting/receiving RF signals. Although not depicted, the RF module 229 may include a transceiver, a Power Amp Module (PAM), a frequency filter, and a Low Noise Amplifier (LNA). The RF module 229 also may include the elements for transmitting/receiving electric wave in free space, e.g., conductor or conductive wire. Although FIG. 2 is directed to the case where the Wi-Fi module 223, the BT module 225, the GPS module 227, and the NFC module 228 are sharing the RF module 229, the present disclosure is not limited thereto but may be embodied in a way that at least one of the Wi-Fi module 223, the BT module 225, the GPS module 227, and the NFC module 228 transmits/receives RF signals an independent RF module.

The SIM card 224 may be designed so as to be inserted into a slot formed at a certain position of the electronic device. The SIM card 224 may store unique identity information (e.g., Integrated Circuit Card Identifier (ICCID)) or subscriber information (e.g., International Mobile Subscriber Identity (IMSI)).

The memory 230 (e.g., the memory 130) may include at least one of an internal memory 232 and an external memory 234. The internal memory 232 may include at least one of a volatile memory (e.g., a Dynamic Random Access Memory (DRAM), a Static RAM (SRAM), a Synchronous DRAM (SDRAM) or a non-volatile memory (e.g., a One Time Programmable Read Only Memory (OTPROM), PROM, an Erasable and Programmable ROM (EPROM), Electrically Erasable and Programmable ROM (EEPROM), a mask ROM, a flash ROM, a NAND flash memory, and a NOR flash memory)

According to an embodiment of the present disclosure, the internal memory 232 may be a Solid State Drive (SSD). The external memory 234 may be a flash drive, such as a Compact Flash (CF), a Secure Digital (SD), a micro-SD, a Mini-SD, an extreme Digital (xD), a Memory Stick, and the like. The external memory 234 may be connected to the electronic device 201 through various interfaces functionally. According to an embodiment of the present disclosure, the electronic device 201 may include a storage device (or storage medium), such as a hard drive.

The sensor module 240 may measure physical quantity or determine the operation status of the electronic device 201 and convert the measured or determined information to an electric signal. The sensor module 240 may include at least one of a gesture sensor 240A, a Gyro sensor 240B, an atmospheric pressure sensor 240C, a magnetic sensor 240D, an acceleration sensor 240E, a grip sensor 240F, a proximity sensor 240G, a color sensor 240H (e.g., Red, Green, Blue (RGB) sensor), a bio sensor 240I, a temperature/humidity sensor 240J, an illumination sensor 240K, and an Ultra Violet (UV) sensor 240M. Additionally or alternatively, the sensor module 240 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 240 may further include a control circuit for controlling at least one of the sensors included therein.

The input device 250 may include a touch panel 252, a (digital) pen sensor 254, keys 256, and an ultrasonic input device 258. The touch panel 252 may be one of capacitive, resistive, infrared, microwave type touch panel. The touch panel 252 may include a control circuit. In the case of the capacitive type touch panel, it is possible to detect physical contact or approximation. The touch panel 252 may further include a tactile layer. In this case, the touch panel 252 may provide the user with haptic reaction.

The (digital) pen sensor 254 may be implemented with a sheet with the same or similar way as touch input of the user or a separate recognition sheet. The keys 256 may include physical buttons, optical key, and keypad. The ultrasonic input device 258 is a device capable of determining data by detecting sound wave through a microphone 288 and may be implemented for wireless recognition. According to an embodiment of the present disclosure, the electronic device 201 may receive the user input submitted through an external device (e.g., a computer, a server, and the like) connected through the communication module 220.

The display module 260 (e.g., the display module 150) may include a panel 262, a hologram device 264, and a projector 266. The panel 262 may be a Liquid Crystal Display (LCD) panel or an Active Matrix Organic Light Emitting Diodes (AMOLED) panel. The panel 262 may be implemented so as to be flexible, transparent, and/or wearable. The panel 262 may be implemented as a module integrated with the touch panel 252. The hologram device 264 may present 3-dimensional image in the air using interference of light. The projector 266 may project an image to a screen. The screen may be placed inside or outside the electronic device. According to an embodiment of the present disclosure, the display module 260 may include a control circuit for controlling the panel 262, the hologram device 264, and the projector 266.

The interface 270 may include an HDMI 272, a USB 274, an optical interface 276, and a D-subminiature (D-sub) 278. The interface 270 may include the communication interface 160 as shown in FIG. 1. Additionally or alternatively, the interface 270 may include a Mobile High-definition Link (MHL) interface, an SD/Multimedia Card (MMC) card interface, and infrared Data Association (irDA) standard interface.

The audio module 280 may convert sound to electric signal and vice versa. At least a part of the audio module 280 may be included in the input/output interface 140 as shown in FIG. 1. The audio module 280 may process the audio information input or output through a speaker 282, a receiver 284, an earphone 286, and a microphone 288.

The camera module 291 is a device capable of taking still and motion pictures and, according to an embodiment of the present disclosure, includes at least one image sensor (e.g., front and rear sensors), a lens (not shown), and Image Signal Processor (ISP) (not shown), and a flash (e.g., LED or xenon lamp) (not shown).

The power management module 295 may manage the power of the electronic device 201. Although not shown, the power management module 295 may include a Power Management Integrated Circuit (PMIC), a charger IC, a battery, and a battery or fuel gauge.

The indicator 297 may display operation status of the electronic device 201 or a part of the electronic device, booting status, messaging status, and charging status. The motor 298 may converts the electronic signal to mechanical vibration. Although not shown, the electronic device 201 may include a processing unit (e.g., GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

Each of the components of the electronic device according to the present disclosure may be implemented by one or more components and the name of the corresponding component may vary depending on a type of the electronic device. The hardware according to an embodiment of the present disclosure may include at least one of the above-described elements. Some of the above-described elements may be omitted from the hardware, or the hardware may further include additional elements. Furthermore, some of the components of the electronic device according to the present disclosure may be combined to be one entity, which can perform the same functions as those of the components before the combination. An electronic device according to various embodiments of the present disclosure may include a communication module for supporting operation of a communication function, a display module for displaying a plurality of communication items generated based on a communication between a user and a communication group including one or more members according to the operation of the communication function, and a processor for detecting a first user selection for selecting a first communication item and a second communication item from the plurality of communication items, detecting a second user selection for selecting at least one group mode from a plurality of group modes, and to control generation of a third communication group based on the selected group mode, a first communication group corresponding to the first communication item, and a second communication group corresponding to the second communication item.

The display module may display at least one communication list screen among a chatting room list screen, an address book list screen, a message list screen, a note list screen, a call log screen, and an email list screen.

The processor may output a movement object linked with the first communication group corresponding to the first communication item based on the first user selection and select the second communication group based on a movement direction of the movement object and an overlapping area between the movement object and at least the other communication group.

The processor may display the selected communication item with at least one of a shape, size, color, and effect different from that of another communication item.

The processor may recognize a movement of a first input for selecting the first communication group corresponding to the first communication item, output at least one group mode item on the second communication group corresponding to the second communication item based on the first input, and, when the first input is released in a state where the group mode item is output, select a group mode corresponding to the output group mode item or a group mode item of a position where the first input is released.

The processor may recognize multiple inputs for selecting two or more communication groups corresponding to the communication items, select a group mode according to movement of the multiple inputs, and select members of the two or more communication groups selected by the multiple inputs according to the selected group mode.

The processor may make a control to further display information on members selected according to the group mode.

The processor may recognize a movement of an input for selecting the communication item and make a control to add or exclude members included in the communication group according to a direction of the recognized movement.

The processor may select information on intersection members between the selected first communication group and the second communication group when an overlapping area between a movement object of the first communication group corresponding to the first communication item and the second communication group corresponding to the second communication item is within a range, and select information on union members including all members of the first communication group and the second communication group when the overlapping area between the movement object and the second communication group exceeds the range.

Based on the movement object of the first communication group corresponding to the first communication item, the processor may determine priorities of communication groups corresponding to the communication items which overlap the movement object and select the second communication group corresponding to the second communication item.

Figure 3:
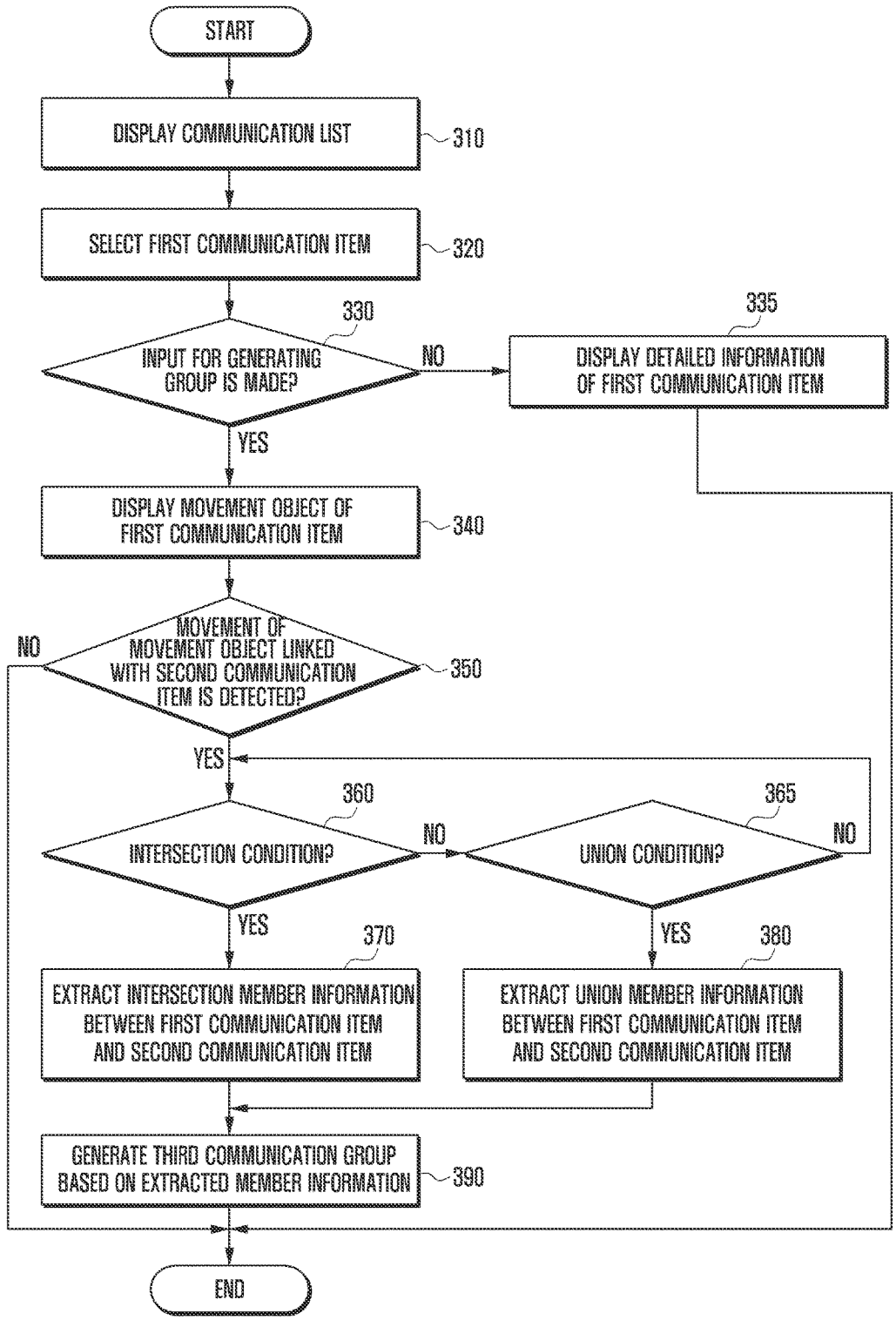
FIG. 3 is a flowchart illustrating a communication group generating method by an electronic device according to various embodiments of the present disclosure.

FIG. 3 is a flowchart illustrating a communication group generating method by an electronic device (electronic device including hardware of FIG. 2) according to various embodiments of the present disclosure.

Referring to FIG. 3, the electronic device according to various embodiments of the present disclosure may perform a function of generating a new communication group by using communication items including one or more members.

In operation 310, the electronic device may display a communication list (for example, a communication list screen) including one or more communication items on a display module according to a user's control or a certain schedule. In such an operation, the electronic device may output communication items including one or more members in an order of time series or character strings. The communication items correspond to communication contents generated based on one or more members, and may include at least one of, for example, member information (for example, information on a member of another electronic device performing communication), communication time information, the number of members, communication content, and a member profile image.

According to various embodiments of the present disclosure, the communication list may be at least one of, for example, a chatting room list, an address book list, a message list, a call list, a note list, and an email list.

In operation 320, the electronic device may detect a user input for selecting a first communication item from the communication items included in the communication list. According to an embodiment of the present disclosure, a user input for selecting a communication item may include at least one of a voice input through a microphone, a proximity input, a touch input, and a key input in a state where the communication list is displayed.

In operation 330, the electronic device may identify whether the user input is an input for generating a group. According to an embodiment of the present disclosure, an operation for identifying whether the user input is the input for selecting the group may be an operation for identifying at least one of various gestures (for example, long press, touch, swipe, drag, pen input, keyboard input, and mouse input).

When the user input is the input for selecting the group, the electronic device may display a movement object connected to the first communication item selected by the user input in operation 340.

The movement object may be understood as a selectable or movable communication item according to a user input or movable information visually separated. The movement object may be displayed with at least one of a shape, size, color, and effect different from those of communication items, so as to be distinguished from the communication items. For example, the movement object may be an object having a relatively opaque or translucent area in comparison with the first communication item.

According to an embodiment of the present disclosure, the electronic device may display a group mode item for determining a group mode (for example, intersection or union) to be generated in a communication list screen by the user input for generating the group.

According to various embodiments of the present disclosure, the group mode item may include an intersection item or a union item, but does not have to be limited thereto. Furthermore, the group mode item may include various group mode items which can be used as members of two communication items.

According to an embodiment of the present disclosure, the group mode item may be superposed (for example, overlaid with) onto the communication item according to a user input. Alternatively, the group mode item may be output within the communication list (for example, top, bottom, left, or right, or on or under the communication item). The group mode item may be output with at least one of a shape, size, color, and effect different from that of the communication item or the movement object so as to be distinguished from the communication item or the movement object.

The electronic device may generate members included in two or more communication items as a communication group of intersection members or a communication group of union members according to the selected group mode item.

When the user input is not the input for selecting the group, the electronic device may display detailed information of the first communication item selected by the user input in operation 335. For example, the detailed information may include at least one of a chatting screen which shows chatting logs with a particular member, an address book screen, a message screen, a note screen, a call log screen, and an email screen.

In operation 350, the electronic device may identify a movement input of the movement object related to a second communication item.

According to an embodiment of the present disclosure, the electronic device may identify a user input for moving the movement object on the second communication item or the group mode item in a state where the movement object connected to the first communication item is displayed. The electronic device may select the second communication item to be used with the first communication item according to the movement of the movement object.

In operation 360, the electronic device may identify whether movement of the movement object corresponds to an intersection condition between the first communication item and the second communication item. When the movement of the movement object corresponds to the intersection condition, the electronic device may compare members of the first communication item and members of the second communication item to select intersection member information in operation 370.

When the movement of the movement object corresponds to the union condition in operation 365, the electronic device may compare the members of the first communication item and the members of the second communication item to select union member information.

For example, the first communication item and the second communication item may include one or more pieces of member information. For example, the first communication item may be communication contents with member A, member B, and member C, and the second communication item may be communication contents with member A, member B, and member D. In this case, the intersection members may be member A and member B, and union members may be member A, member B, member C, and member D.

According to an embodiment of the present disclosure, when a condition for generating a communication group according to movement of the movement object is generated, the electronic device may select member information included in each communication item and identify whether there are overlapping members in the member information. The member information may include at least one of, for example, a chatting session ID, a chatting message ID, an email address, a phone number, a member name, and social network account information.

The electronic device may select member information stored in the electronic device or may receive corresponding member information through a server that provides a communication service function with a particular member. For example, when a member included in the first communication item or the second communication item is not stored in the electronic device or does not exist in a list (for example, a friend list, a family list, an office list, and the like), the electronic device may make a request for member information included in the first communication item or the second communication item to the server. The server may transmit member information included in the first communication item or the second communication item to the electronic device in response to the request.

Meanwhile, according to an embodiment of the present disclosure, the electronic device may output member information of a group to be generated, on the communication item according to movement of the movement object. For example, when an overlapping area between the movement object and the second communication item is within a range, the electronic device may output intersection member information (for example, information on a member name or ID) near the second communication item (for example, top, bottom, left, or right, or above the communication item). Furthermore, when the overlapping area between the movement object and the second communication item exceeds the range, the electronic device may output union member information near the second communication item.

In operation 390, the electronic device may generate a communication group based on member information selected in operation 370 or 380. In connection with this, the electronic device may perform communication through member information (for example, information on a phone number, an address, and an ID) included in the generated communication group.

According to an embodiment of the present disclosure, the electronic device may display a screen through which communication contents can be transmitted/received to/from members included in the generated communication group. For example, the screen through which communication contents can be transmitted/received may include at least one of a chatting room screen where chatting with members of the generated communication group can be performed, an address book making screen where contacts can be transmitted/received to/from members of the generated communication group, a message writing screen where messages can be transmitted/received to/from members of the generated communication group, a note writing screen where notes can be transmitted/received to/from member of the generated communication group, a group call screen where a group call can be made with members of the generated communication group, and an email writing screen where email can be transmitted/received to/from member of the generated communication group.

A method of generating a group according to various embodiments of the present disclosure may include an operation for displaying a plurality of communication items based on a communication between a user and each of the communication groups including one or more members, an operation for selecting at least a first communication item and a second communication item from the plurality of communication items based on a first user selection, an operation for selecting at least one group mode from a plurality of group modes based on a second user selection, and an operation for generating a third communication group based on the group mode, a first communication group corresponding to the first communication item, and a second communication group corresponding to the second communication item.

The plurality of group modes may include at least a first group mode and a second group mode, and the operation for generating the third communication group may include an operation for generating the third communication group such that the third communication group includes members included in both the first communication group and the second communication in the first group mode, and an operation for generating the third communication group such that the third communication group includes members included in at least one of the first communication group and the second communication group in the second group mode.

The operation for displaying the plurality of communication items includes an operation for displaying at least one of a chatting room list screen, an address book list screen, a message list screen, a note list screen, a call log screen, and an email list screen.

The operation for selecting at least the first communication item and the second communication item may include an operation for selecting the first communication group corresponding to at least one first communication item from the communication items and an operation for selecting the second communication group based on movement of the first communication group and an overlapping area between the first communication group and another communication item.

The operation for selecting at least the first communication item and the second communication item may include an operation for displaying the selected communication item with at least one of a shape, size, color, and effect different from that of another communication item.

The operation for selecting at least the first communication item and the second communication item may further include an operation for outputting a movement object linked with a communication group selected by an input for selecting the first communication group corresponding to the first communication item or the second communication group corresponding to the second communication item and an operation for displaying a group mode item including at least one of an intersection item and a union item. The operation for generating the third communication group may include an operation for generating at least one of the intersection group and the union group based on the selected group mode item.

The operation for displaying the group mode item may be one of an operation for displaying the group mode item to be superposed onto other communication groups except for the first communication group corresponding to the first communication item and an operation for displaying the group mode item above the communication groups.

The operation for selecting the group mode may further include an operation for recognizing movement of a first input for selecting the first communication item, an operation for outputting one of the group mode items on the first communication group corresponding to the second communication item based on the first input, and an operation for selecting a group mode corresponding to the output group mode item when the first input is released in a state where the group mode item is output.

The operation for selecting at least the first communication item and the second communication item may include an operation for recognizing multiple inputs for selecting two or more communication groups corresponding to the communication item, and the operation for recognizing the multiple inputs may include an operation for selecting a group mode according to movement of the multiple inputs, and an operation for selecting members of the two or more selected communication groups by the multiple inputs according to the selected group mode.

The operation for generating the third communication group may further include an operation for displaying member information selected according to the group mode.

The operation for displaying the member information may further include an operation for recognizing movement of the user input and an operation for adding or excluding members included in the communication group according to a direction of the recognized movement.

The operation for selecting at least the first communication item and the second communication item may include one of an operation for selecting intersection member information between the selected first communication item and second communication item when an overlapping area between a movement object corresponding to the first communication item and the second communication item is within a range, and an operation for selecting union member information including all members in the first communication items and the second communication items when the overlapping area between the movement object and the second communication item exceeds the range.

The operation for selecting the second communication item may include an operation for determining priorities of communication items onto which the movement object is superposed based on movement of the movement object corresponding to the first communication item and selecting the second communication group corresponding to the second communication item.

Hereinafter, a message list or a chatting list will be described as an example of the communication list according to various embodiments of the present disclosure.

FIGS. 4A, 4B, 4C, 4D, 5A, 5B, 5C, 5D, and 5E illustrate a communication group generating screen according to various embodiments of the present disclosure.

Figure 4A:
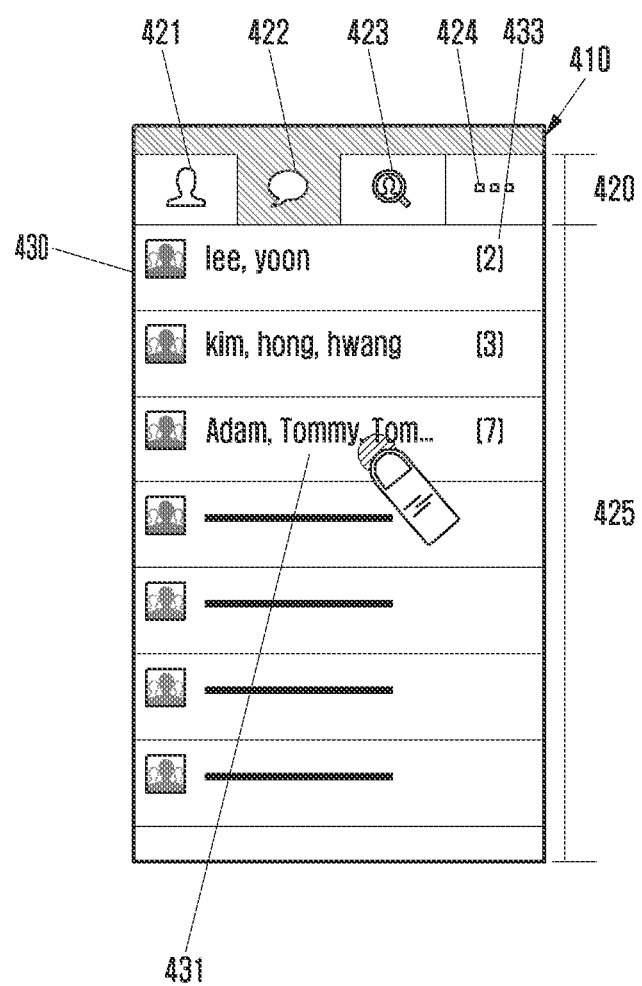
FIGS. 4A, 4B, 4C, 4D, 5A, 5B, 5C, 5D, and 5E illustrate a communication group generating screen according to various embodiments of the present disclosure.

Referring to FIGS. 4A, 4B, 4C, and 4D, when a user input control or an input for a chatting list screen operation is generated, the electronic device may output a chatting list screen 410 as indicated in FIG. 4A.

According to an embodiment of the present disclosure, when an input for selecting a chatting function app (for example, a messenger app) is generated, the electronic device may identify chatting lists or chatting logs, and may support sequential outputs of one or more chatting room items in an order of time series or character strings. Each of the chatting room items may be output together with some of the information on at least one member who participates in the chatting, information on the number of members who participate in the chatting, profile images, and chatting contents.

According to an embodiment of the present disclosure, when the chatting list screen 410 is not output by default based on an input for selecting a chatting function app, the electronic device may support the output of the chatting list screen 410 by a user setting or selection.

According to an embodiment of the present disclosure, the chatting list screen 410 may include a menu area 420 supporting a chatting function or a chatting list area 425 in which chatting room items 430 are arranged. The menu area 420 may include a friend list menu 421, a chatting room list menu 422, a find friend menu 423, or an option menu 424, but the present disclosure is not limited thereto.

According to an embodiment of the present disclosure, the electronic device may perform group chatting with two or more members. In this case, when a communication group corresponding to the chatting room item 430 includes two or more members, the electronic device may support the output of group information 433 (for example, the number of members).

Figure 4B:
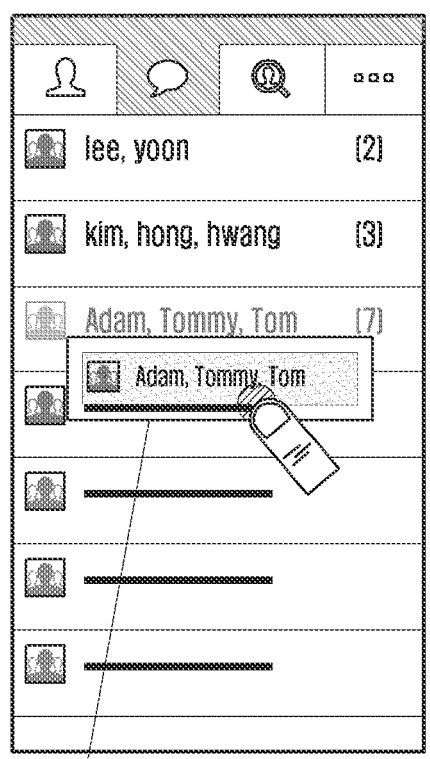

The user may perform an operation (for example, a touch event) for selecting a particular chatting room item to generate a chatting group in a state where the chatting list screen 410 is displayed. Thereafter, the electronic device may output a movement object 440 linked with the selected chatting room item 430 to the chatting list screen 410 as illustrated in FIG. 4B.

An operation for selecting a particular chatting room item to generate a chatting group may be one of the various preset gesture events (for example, long press, touch, swipe, drag, pen input, keyboard input, and mouse input).

For example, when the user selects a first chatting room item 431 from the chatting room items included in the chatting list and performs a long press on the first chatting room item 431 in FIG. 4A, the electronic device may output the movement object 440 corresponding to the first chatting room item 431.

Meanwhile, the user may perform an operation (for example, a touch event) for displaying detailed information of a chatting room item or an operation (for example, a scroll event) for searching for a chatting room item in the chatting list screen 410. For example, when the user taps a particular chatting room item, the electronic device may support the output of a detailed chatting information screen of the particular chatting room item. Alternatively, the electronic device may support the output of a chatting room item which is not output to the chatting room list area 425 according to the operation for searching for a chatting room item. For example, the chatting room item which is not output to the chatting room list area may be arranged on at least one of a top, bottom, left, or right, or on or under the chatting list area.

According to an embodiment of the present disclosure, the electronic device may output the movement object 440 linked with the first chatting room item 431 with at least one of a shape, size, color, and effect different from that of the first chatting room item 431 so as to be distinguished from the first chatting room item 431. Furthermore, the electronic device may output the first chatting room item 431 of which the movement object 440 is generated with at least one of a shape, size, color, and effect different from those of other chatting room items of which movement objects are not generated.

According to an embodiment of the present disclosure, when a touch is maintained in a state where the movement object 440 is displayed, the electronic device may move the movement object 440 along the movement of the touch input. Meanwhile, when the touch is released in the state where the movement object 440 is displayed, the electronic device may stop displaying the movement object.

Figure 4C:
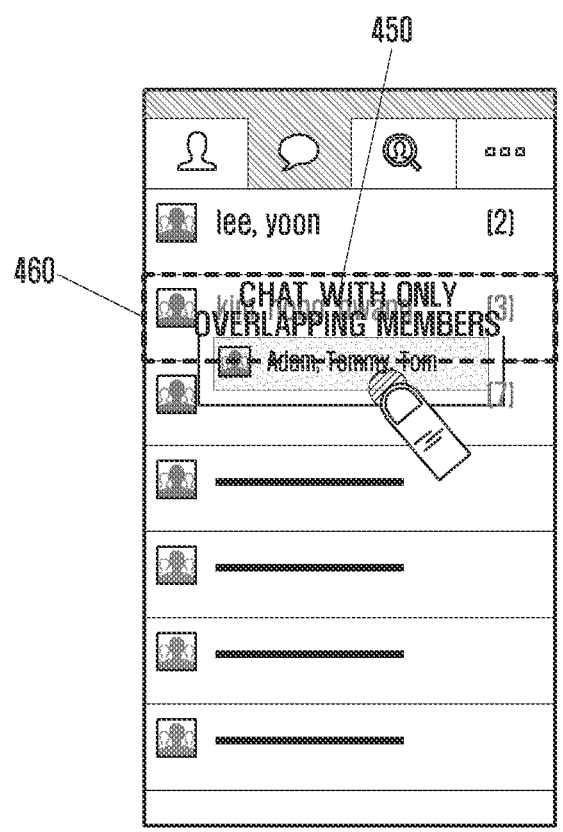

The user may move the movement object on a second chatting room item 450 to generate a group in the state where the movement object 440 is displayed as indicated in FIG. 4C. The electronic device may select information on intersection members or union members between the first chatting room item 431 and the second chatting room item 450 based on an overlapping area between the movement object 440 and the second chatting room item 450, so as to generate a chatting group.

According to an embodiment of the present disclosure, when the movement object 440 is superposed onto the second chatting room item 450 as indicated in FIG. 4C, the electronic device may determine an overlapping area between the second chatting room item 450 and the movement object. When the overlapping area is within a certain condition, the electronic device may select information on intersection members between the members of the first chatting room item 431 and the second chatting room item 450. The condition may be preset to the electronic device or set or changed by the user.

Figure 4D:
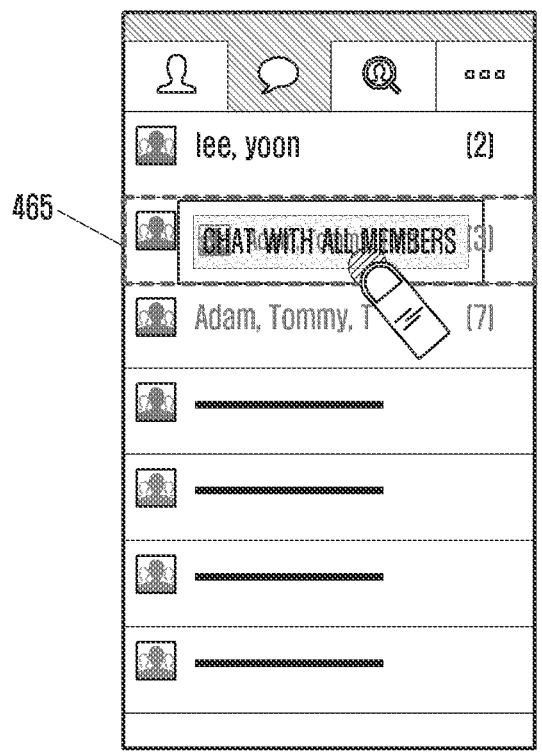

According to another embodiment of the present disclosure, when the movement object 440 is superposed onto the second chatting room item 450 as indicated in FIG. 4D, the electronic device may determine an overlapping area between the second chatting room item 450 and the movement object. When the overlapping area exceeds the certain condition, the electronic device may select information on union members between the members of the first chatting room item 431 and the second chatting room item 450. The certain condition may be preset to the electronic device or set or changed by the user.

Meanwhile, when the movement object is superposed onto a chatting room item while moving, the electronic device may output a group mode item according to a range of an overlapping area. For example, when an overlapping area between the movement object 440 and the second chatting room item 450 while the movement object moves is within the certain condition as indicated in FIG. 4C, the electronic device may output an intersection item 460 (for example, an intersection mode or chatting with only overlapping members). Furthermore, when an overlapping area between the movement object 440 and the second chatting room item 450 while the movement object moves exceeds the certain condition as indicated in FIG. 4D, the electronic device may output a unit item 465 (for example, a union mode or chatting with all members).

As described above, the electronic device according to various embodiments of the present disclosure may determine an overlapping area between the movement object and the chatting room item and generate a communication group of union members or intersection members.

The electronic device according to various embodiments of the present disclosure may determine a priority of an overlapping area between the movement object and a chatting room item based on directivity of the movement of the movement object and select another chatting room item to be used.

Figure 5A:
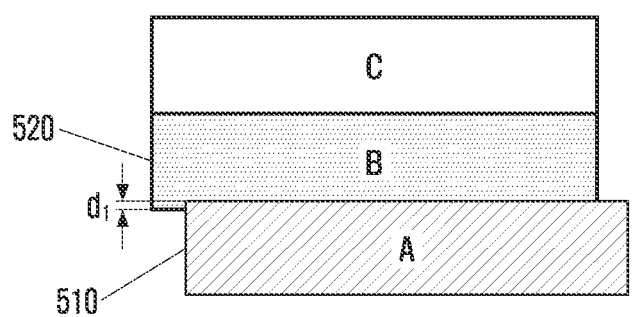
Figure 5B:
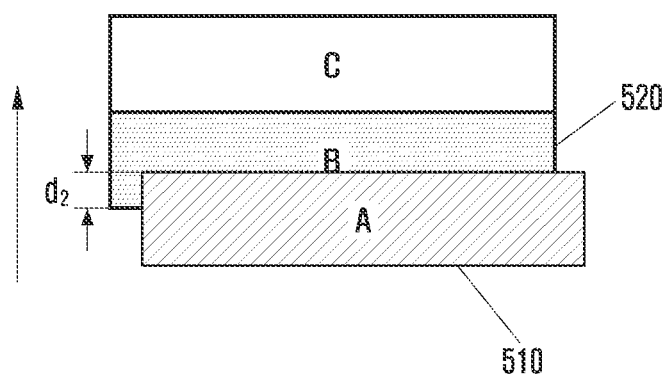

For example, referring to FIGS. 5A, 5B, 5C, 5D, and 5E, chatting room items and a movement object are schematized. Figure A 510 may be understood as a movement object, and figure B 520 and figure C 530 may be understood as chatting room items. Figure A 510, which is the movement object, may move in a direction from figure B 520 to figure C 530. As indicated in FIG. 5A, when an overlapping area (M) between figure A 510 and figure B 520 does not exceed a first condition (d1) (for example, M<d1), figure B 520 may not be selected by figure A 510 which is the movement object. As indicated in FIG. 5B, when an overlapping area between figure A 510 and figure B 520 exceeds the first condition (d1) and is within a second condition (d2) (d1<M<d2) while figure A 510 moves to figure B 520, the electronic device may recognize that an intersection mode condition is met. In this case, the electronic device may output intersection mode information on figure B 520.

Figure 5C:
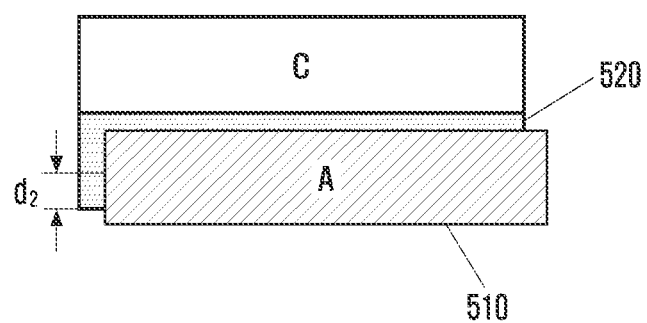

As indicated in FIG. 5C, when the overlapping area between figure A 510 and figure B 520 exceeds the second condition (d2) (d2<M), the electronic device may recognize that a union mode condition is met. In this case, the electronic device may output union mode information on figure B 520.

Figure 5D:
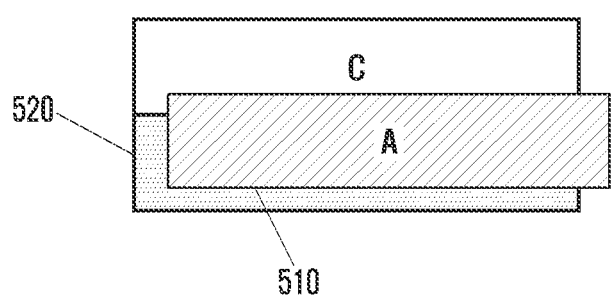
Figure 5E:
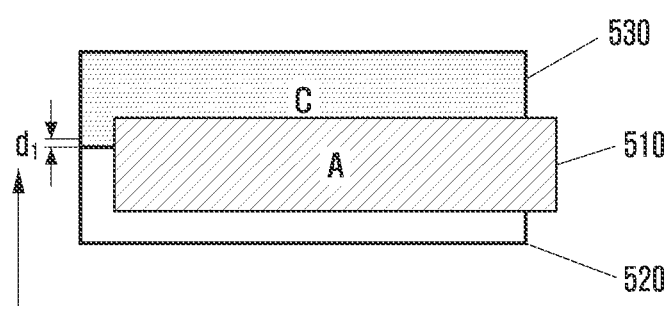

According to an embodiment of the present disclosure, figure A, which is the movement object, may be simultaneously superposed on figure B 520 and figure C 530 as indicated in FIG. 5D. In this case, the electronic device may determine directivity (for example, top, bottom, left, right, on, or under) of figure A 510 and assign a higher priority to a condition under which figure A 510 is superposed on figure C 530 than a condition under which figure A 510 is superposed on figure B 520. For example, as indicated in FIG. 5E, when a condition of an overlapping area between figure C 530 and figure A 510 while figure A 510 moves in a direction from figure B 520 to figure C 530 exceeds the first condition, the electronic device may change an object selected by figure A 510 from figure B 520 to figure C 530. The electronic device may assign a higher priority to a range of an overlapping area between figure C 530 and figure A 510 than a range of an overlapping area between figure B 520 and figure A 510, so as to selectively output a group mode item.

Figure 6A:
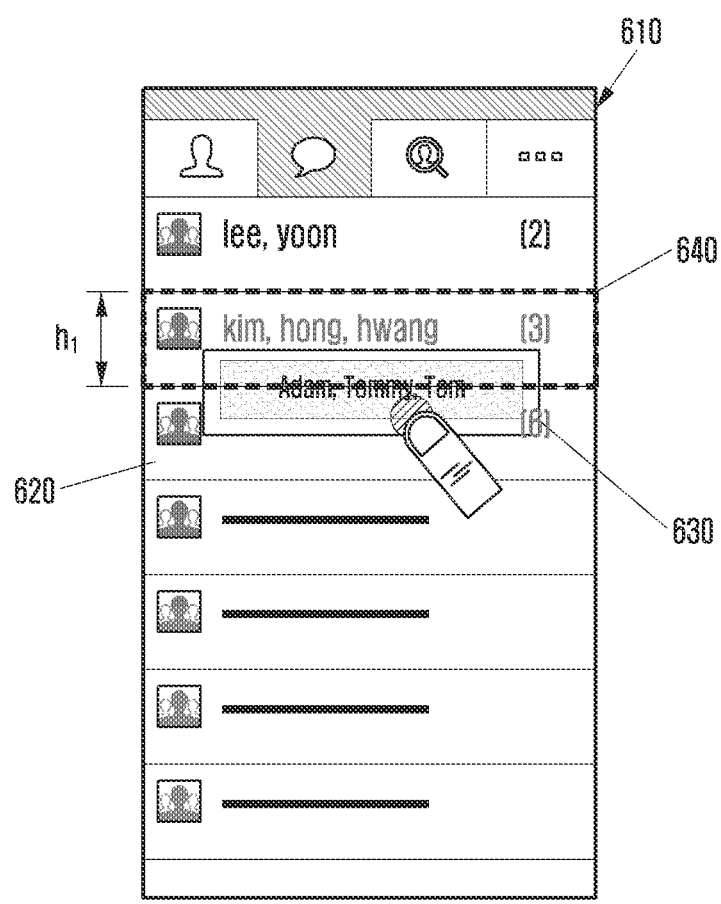
FIGS. 6A and 6B illustrate a communication group generating screen according to various embodiments of the present disclosure.
Figure 6B:
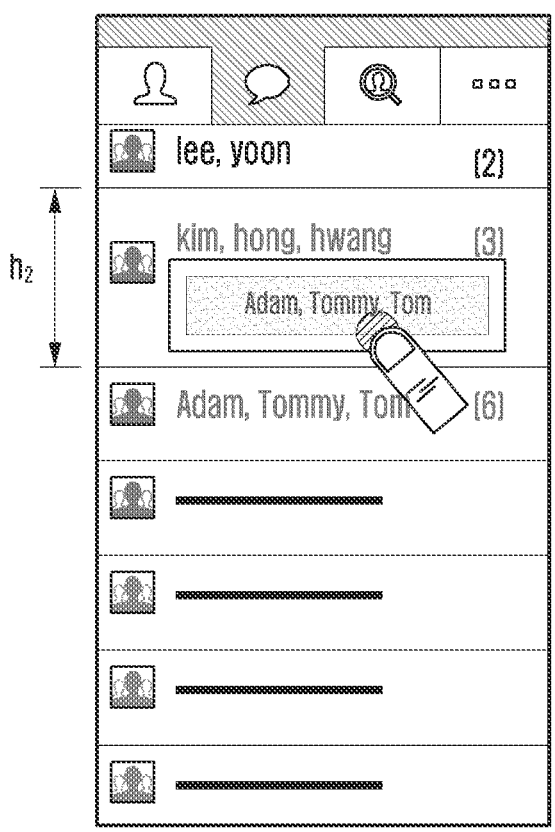

FIGS. 6A and 6B illustrate a communication group generating screen according to various embodiments of the present disclosure.

Referring to FIGS. 6A and 6B, the electronic device according to an embodiment of the present disclosure may output a chatting list screen 610 including one or more chatting room items according to a user input. When the user selects one chatting room item to generate a communication group, the electronic device may display a movement object linked with the selected chatting room item. When the movement object is displayed by a touch input, the user may select another chatting room item included in the chatting list screen by moving the movement object while maintaining the touch.

According to an embodiment of the present disclosure, when a movement object 630 linked with a first chatting room item 620 is displayed in a screen as shown in FIG. 6A, the user may upwardly move (for example, drag) the movement object while maintaining a user input (for example, a touch). A movement object 630 may move upwardly, for example, in a direction of a second chatting room 640 along the movement of the user input. In this case, when a range of an overlapping area between the movement object and a chatting room item exceeds the first condition (see FIGS. 5A, 5B, 5C, 5D, and 5E), the electronic device may select the chatting room item which overlaps the movement object.

When the movement object 630 is superposed on the second chatting room item 610 and thus the second chatting room item 610 is selected, the electronic device according to various embodiments of the present disclosure may output a selection effect. For example, the movement object 630 or the second chatting room item 640 may be displayed with at least one of a shape, size, color, and effect different from those of other chatting room items, so as to be distinguished from the other chatting room items.

According to an embodiment of the present disclosure, when the second chatting room item 640 is selected by the movement of the movement object 630, the electronic device may expand the size of the second chatting room item 640 as illustrated in FIG. 6B. For example, in the chatting list screen, the electronic device may display each of the chatting room items in an area having a first size (h1). When the second chatting room item 640 is selected according to the movement of the movement object 630, the electronic device may display the second chatting room item 640 in an area having a second size (h2). Accordingly, the electronic device may easily determine an overlapping area between the movement object 630 and the second chatting room item 640.

Meanwhile, according to various embodiments of the present disclosure, when the second chatting room item 640 is selected by the movement object 630, the electronic device may compare the second chatting room item 640 with other chatting room items and display the second chatting room item 640 with at least one of a color and effect different from those of the other chatting room items. For example, the electronic device may process the second chatting room item 640 to be highlighted or change a color of the second chatting room item 640.

Figure 7A:
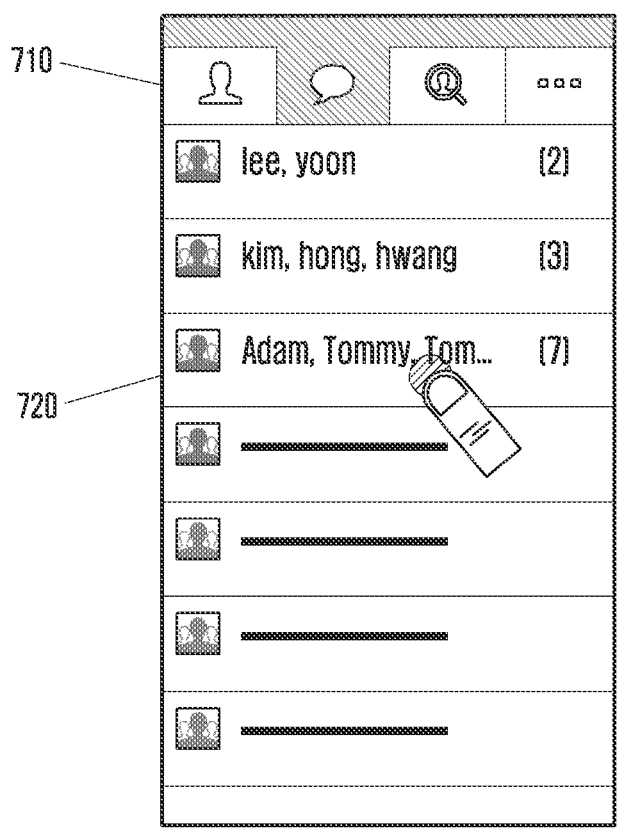
FIGS. 7A, 7B, and 7C illustrate a communication group generating screen according to various embodiments of the present disclosure.
Figure 7B:
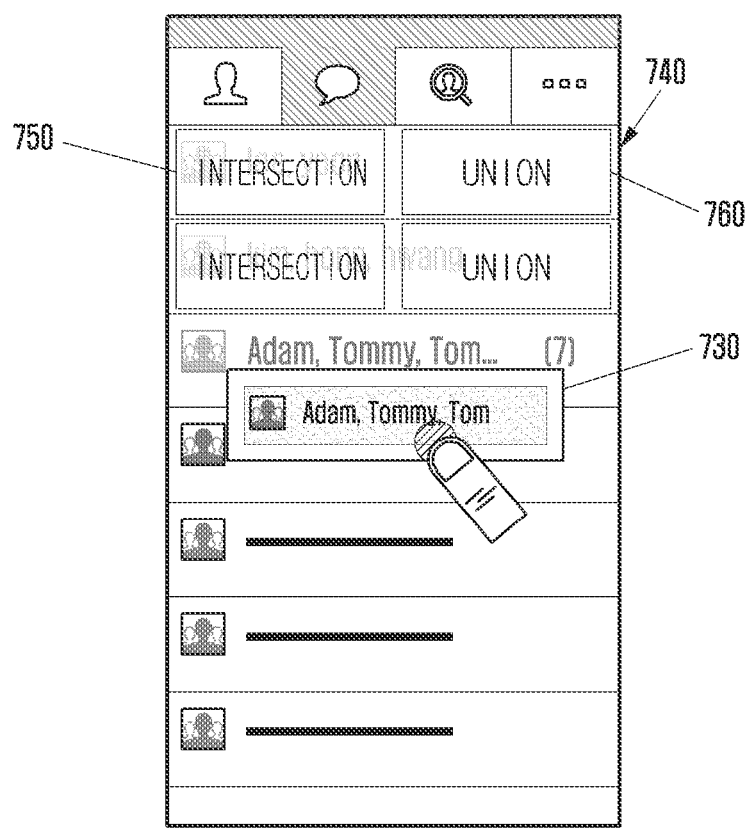
Figure 7C:
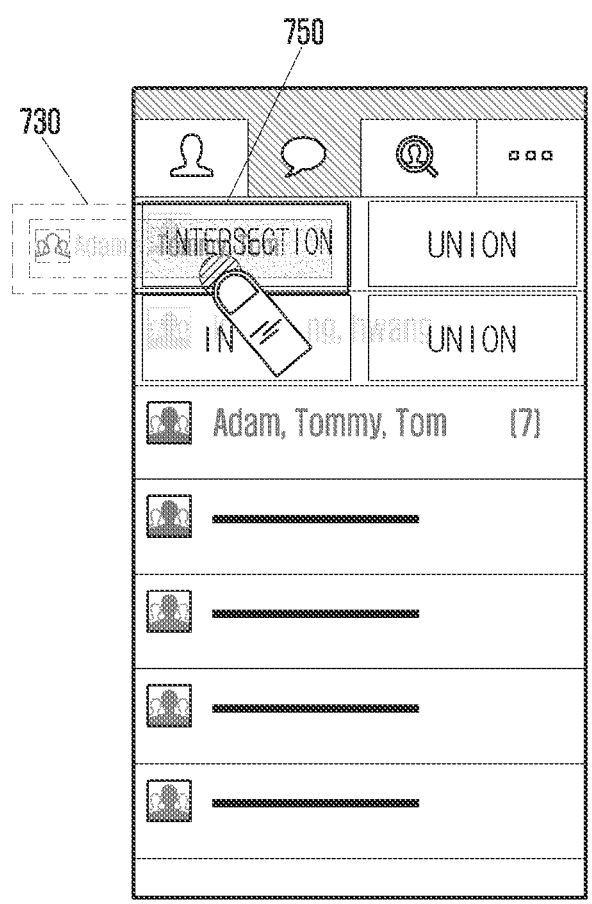

FIGS. 7A, 7B, and 7C illustrate a communication group generating screen according to various embodiments of the present disclosure.

Referring to FIGS. 7A, 7B, and 7C, the electronic device may support the output of a chatting list screen including a plurality of chatting room items according to a user input.

For example, when the user activates a chatting function app and selects a chatting list menu, the electronic device may display a chatting list screen 710 including a plurality of chatting room items as indicated in FIG. 7A. The chatting room item may include at least one of information on members who participate in a chatting room, profile images, the number of members, and chatting contents.

The user may select a chatting group (for example, a first chatting room item 720) which the user desires to overlap. For example, the user may generate a user input (for example, a touch or long press) in a position of the first chatting room item 720. The electronic device may recognize the user input as a group generating input for superposing the first chatting room item 720 into another chatting room item.

At this time, the electronic device may make a control to display a movement object 730 linked with the first chatting room item 720 as indicated in FIG. 7B.

Furthermore, the electronic device may display group mode items 750 and 760 on other chatting room items, so as to distinguish the selected chatting room item from other chatting room items to be superposed. For example, as indicated in FIGS. 7B and 7C, the electronic device may display an intersection item 750 or a union item 760 in an area of chatting room items 740 other than the first chatting room item 720 of which the movement object 730 is displayed.

The user may move the movement object to select at least one of the group mode items 750 and 760 displayed on the chatting room item 740, which the user desires to use, and then release a user input. The electronic device may select information on members of the first chatting room item 720 and members of the second chatting room item 740 located at a position where the user input is released, according to the group mode item selected by the release of the user input.

For example, as illustrated in FIG. 7C, the user may move the movement object 730 to select the intersection item 750 displayed on the chatting room item and then release the user input. Thereafter, the electronic device may select member information by comparing member information of the first chatting room item 720 and member information of the second chatting room item 740. Thereafter, the electronic device may make a request for generating a new group to an external device (for example, a network, computer or server) based on the selected member information. The external device may generate a group including intersection members between the first chatting room item 720 and the second chatting room item 740.

FIGS. 8A, 8B, 8C, and 8D illustrate a communication group generating screen according to various embodiments of the present disclosure.

Referring to FIGS. 8A, 8B, 8C, and 8D, according to various embodiments of the present disclosure, the electronic device may detect a touch input for selecting one chatting room item from a chatting room list and then support the output of a chatting group mode item according to a movement direction of the touch (for example, top, bottom, left, right, on, or under).

Figure 8A:
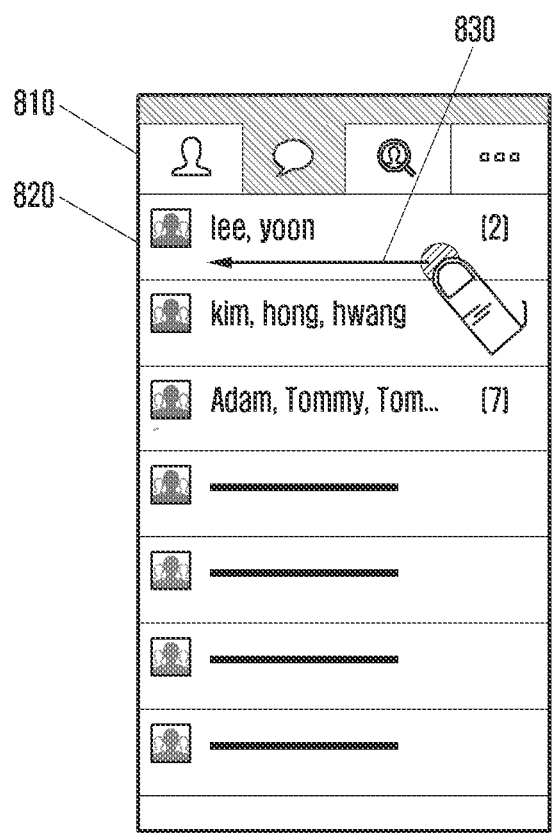
FIGS. 8A, 8B, 8C, and 8D illustrate a communication group generating screen according to various embodiments of the present disclosure.

The electronic device may display a chatting list screen 810 including one or more chatting room items according to a user request signal as indicated in FIG. 8A.

According to an embodiment of the present disclosure, the user may generate a touch input for selecting a first chatting room item 820 corresponding to a chatting group to be superposed. For example, the touch input for selecting the first chatting room item 820 may be a long press, but the present disclosure is not limited thereto.

The electronic device may display the selected chatting room item with at least one of a shape, color, and effect different from those of other chatting room items, so as to distinguish the selected chatting room item from the other chatting room items, but the present disclosure is not limited thereto. During such an operation, the user may make a control to maintain the input for selecting the first chatting room item 820.

Thereafter, the user may move the user input for the first chatting room item 820. For example, the user input may move in a left direction 830.

Figure 8B:
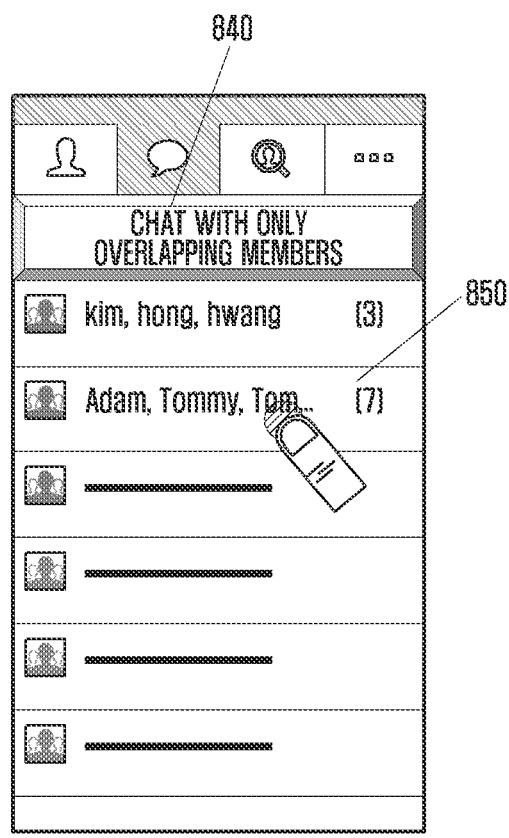

The electronic device may output a designated group mode according to a movement direction of a first touch. For example, as indicated in FIG. 8B, the electronic device may output an intersection item 840 (for example, chatting with only overlapping members) on the first chatting room item 820.

Thereafter, the user may select a second chatting room item 850 onto which the first chatting room item 820 will be superposed. The electronic device may compare member information of the first chatting room item 820 and member information of the second chatting room item 850 to generate one group chatting room based on intersection members therebetween in response to the superposition.

Figure 8C:
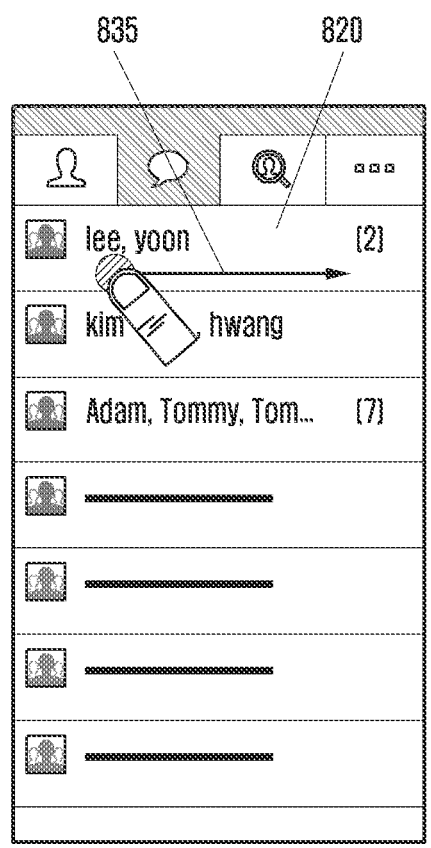
Figure 8D:
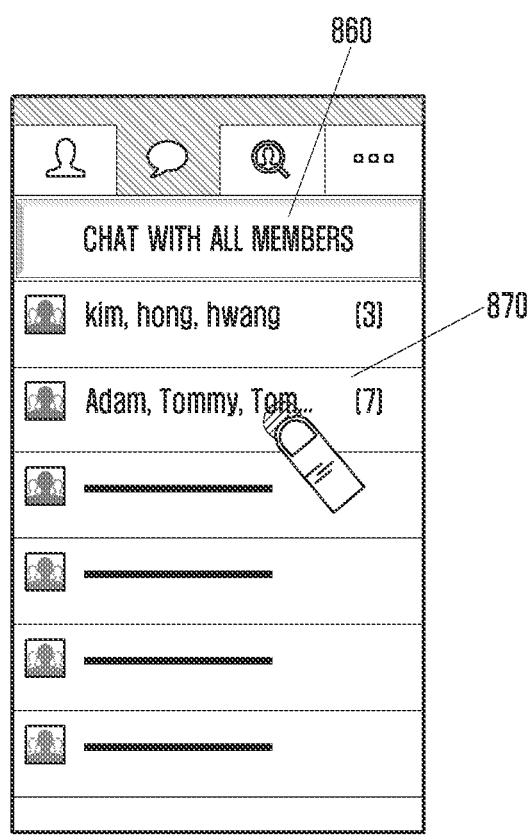

According to another embodiment of the present disclosure, the user may move the user input for the first chatting room item 820 in a right direction 835 as indicated in FIG. 8C. The electronic device may output a union item 860 (for example, chatting with all members) on the first chatting room item 820 as indicated in FIG. 8D. Thereafter, the user may select a second chatting room item 870 onto which the first chatting room item 820 will be superposed. The electronic device may compare member information of the first chatting room item 820 and member information of the second chatting room item 870 to generate one group chatting room based on union members therebetween in response to the selection.

FIGS. 9A, 9B, 9C, and 9D illustrate a communication group generating screen according to various embodiments of the present disclosure.

Referring to FIGS. 9A, 9B, 9C, and 9D, according to various embodiments of the present disclosure, when an input signal for generating a group is detected in a communication list screen 910, the electronic device may support the output of a group mode item on an upper portion of the communication list.

Figure 9A:
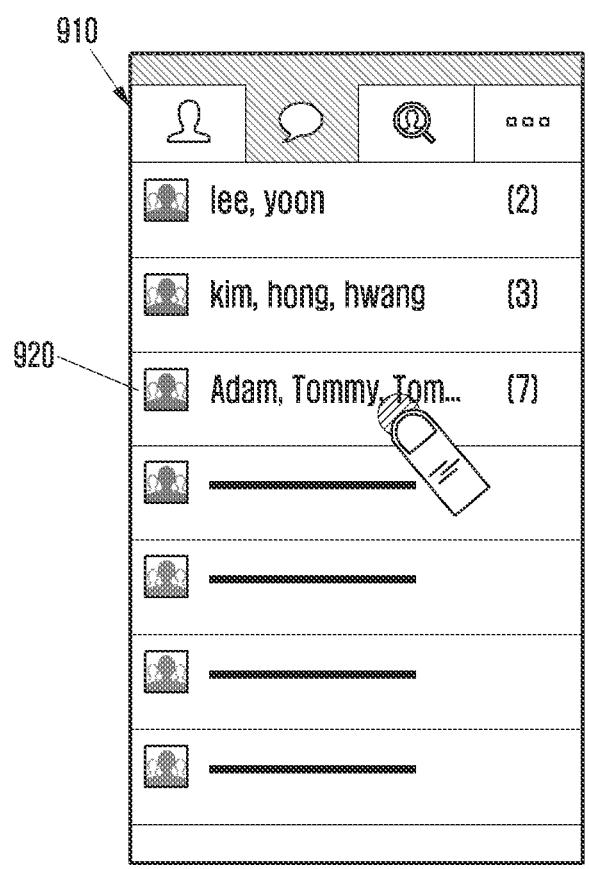
FIGS. 9A, 9B, 9C, and 9D illustrate a communication group generating screen according to various embodiments of the present disclosure.
Figure 9B:
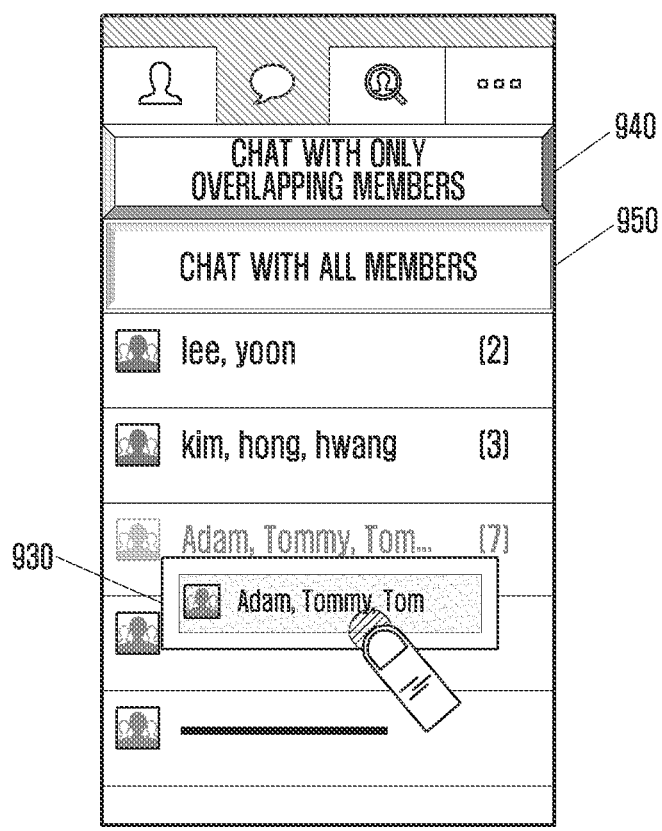

For example, as indicated in FIG. 9A, the user may generate a touch input for selecting a first chatting room item 910 to generate a communication group in the communication list screen 910. The electronic device may display group mode items, for example, an intersection item 940 and a union item 950 on an upper portion of the communication list in response to the touch input as illustrated in FIG. 9B.

Figure 9C:
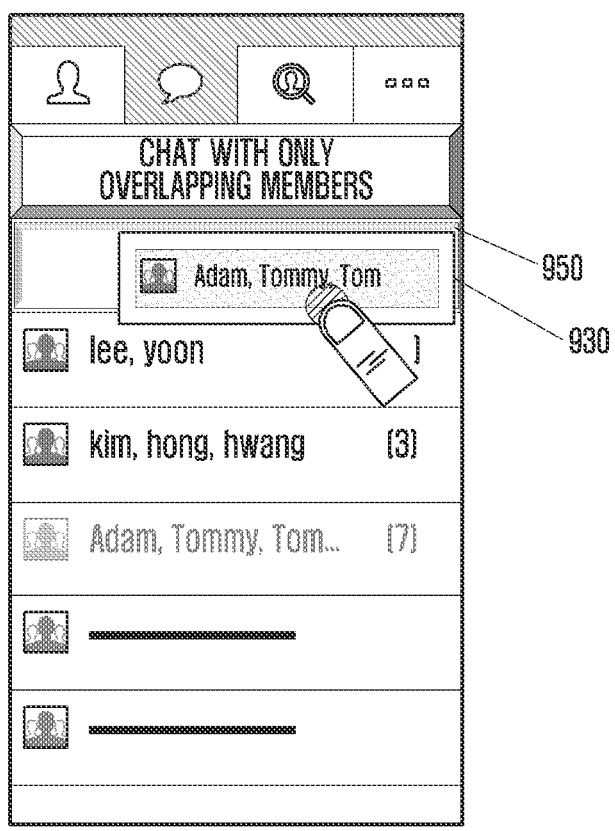

At this time, the electronic device may output a movement object 930 of the first chatting room item 920. The user may move the movement object 930 to superpose the movement object 930 onto an item to be selected from the group mode items located near the first chatting room item 920. For example, the user may move the movement object 930 of the first chatting room item 920 to superpose the movement object 930 onto a union item 950 as illustrated in FIG. 9C.

Figure 9D:
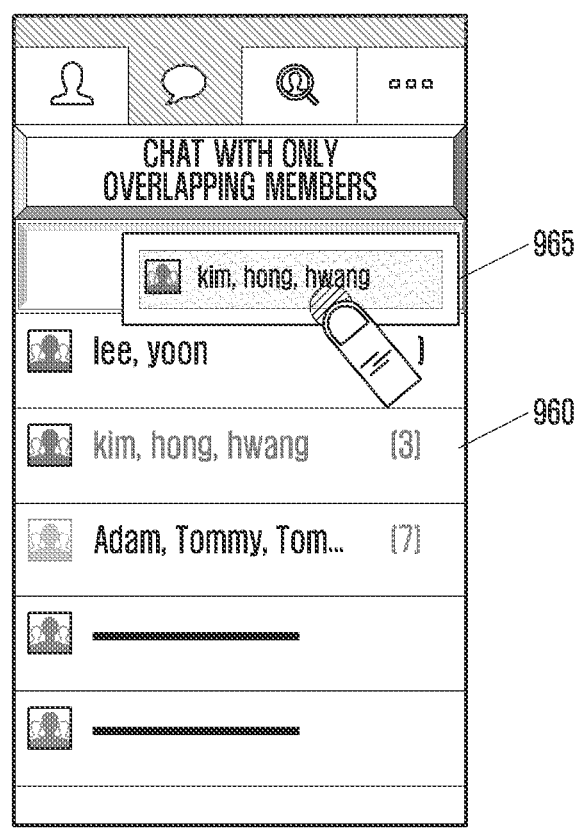

Thereafter, the user may select a second chatting room item 960 onto which the first chatting room item 920 will be superposed, and may move a movement object 965 linked with the second chatting room item 960 on the union item 950 as indicated in FIG. 9D. The electronic device may select union member information from members of the first chatting room item 920 which has moved on the union item 950 and members of the second chatting room item 960, and may generate a group chatting room based on the selected union member information.

Figure 10A:
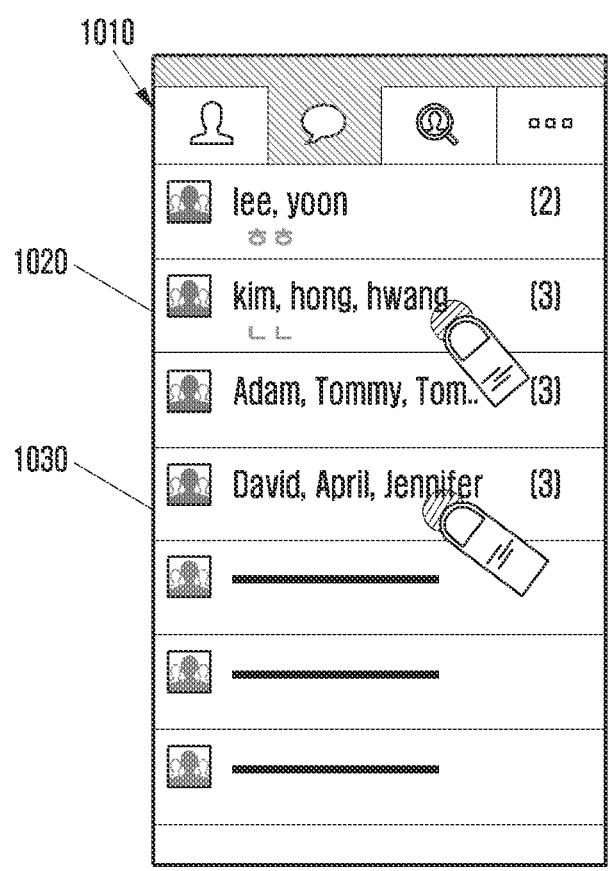
FIGS. 10A, 10B, and 10C illustrate a communication group generating screen according to various embodiments of the present disclosure.
Figure 10B:
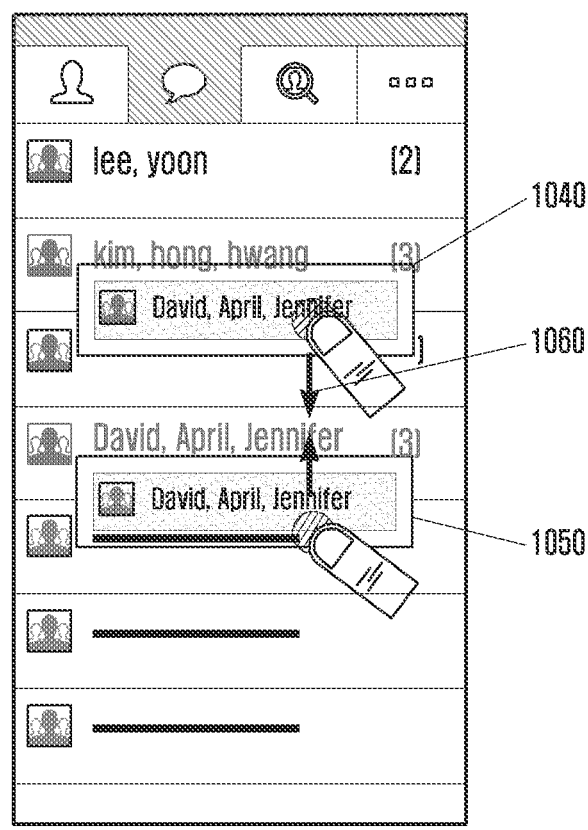
Figure 10C:
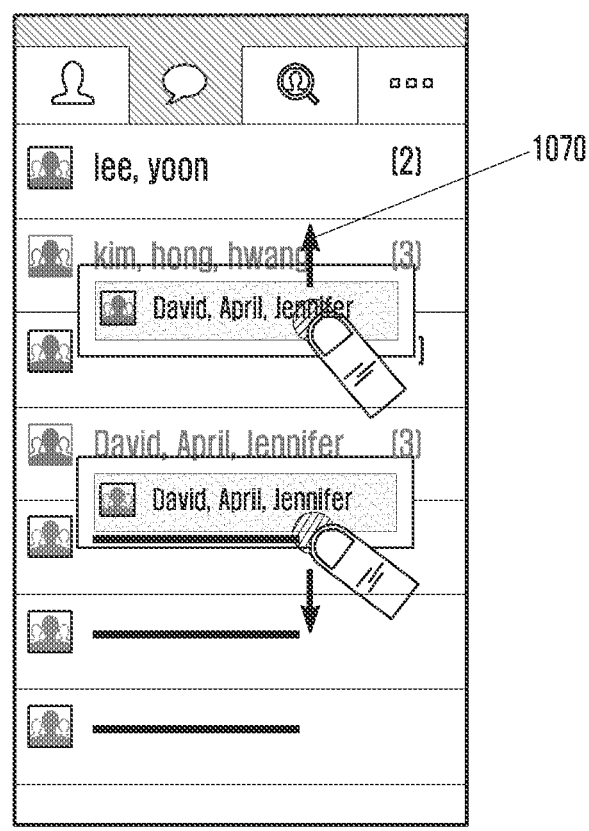

FIGS. 10A, 10B, and 10C illustrate a communication group generating screen according to various embodiments of the present disclosure.

Referring to FIGS. 10A, 10B, and 10C, after an input for selecting two or more chatting room items is generated, the electronic device according to various embodiments may support the generation of a group chatting room of an intersection mode or a union mode according to a movement direction of the movement object.

The user may generate an input signal for simultaneously or sequentially selecting two or more chatting room items 1020 and 1030 in a chatting room list screen 1010 as indicated in FIG. 1OA. During such an operation, the user may make a control to maintain the touch input for selecting two chatting room items.

The electronic device may make a control to output movement objects 1040 and 1050 for the two selected chatting room items 1020 and 1030 in response to the touch input as indicated in FIG. 10B.

Thereafter, the user may move the two movement objects 1040 and 1050 to select a group mode of a group chatting room to be generated based on two chatting room items 1020 and 1030. The electronic device may generate a new group chatting room with members of the designated group mode according to movement directions of the two movement objects.

For example, the electronic device may configure an intersection mode corresponding to a first input (for example, pinch-in) 1060 and a union mode corresponding to a second input (for example, pinch-out) 1070, and vice versa.

According to an embodiment of the present disclosure, the user may generate the first input 1060 to make the two movement objects 1040 and 1050 closer to each other in a state where the two movement objects 1040 and 1050 are displayed as indicated in FIG. 10B. The electronic device may generate a new group chatting room based on intersection members between the two chatting room items 1020 and 1030 in response to the first input 1060.

According to an embodiment of the present disclosure, the user may generate the second input 1070 to make the two movement objects 1040 and 1050 spaced apart from each other in the state where the two movement objects 1040 and 1050 are displayed as indicated in FIG. 10C. The electronic device may generate a new group chatting room based on union members between the two chatting room items 1020 and 1030 in response to the second input 1070.

Figure 11A:
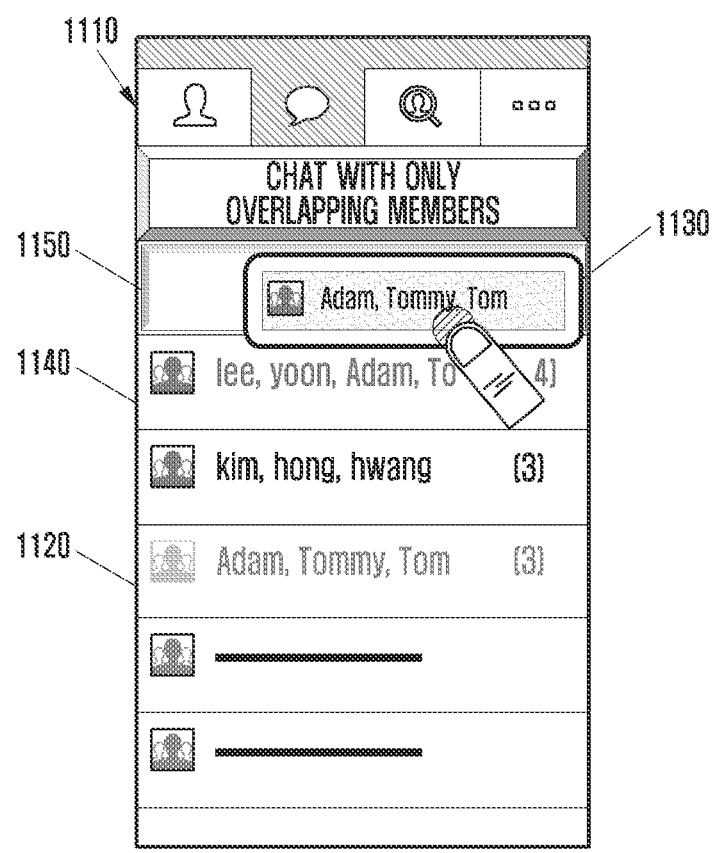
FIGS. 11A, 11B, and 11C illustrate a communication group generating screen according to various embodiments of the present disclosure.
Figure 11B:
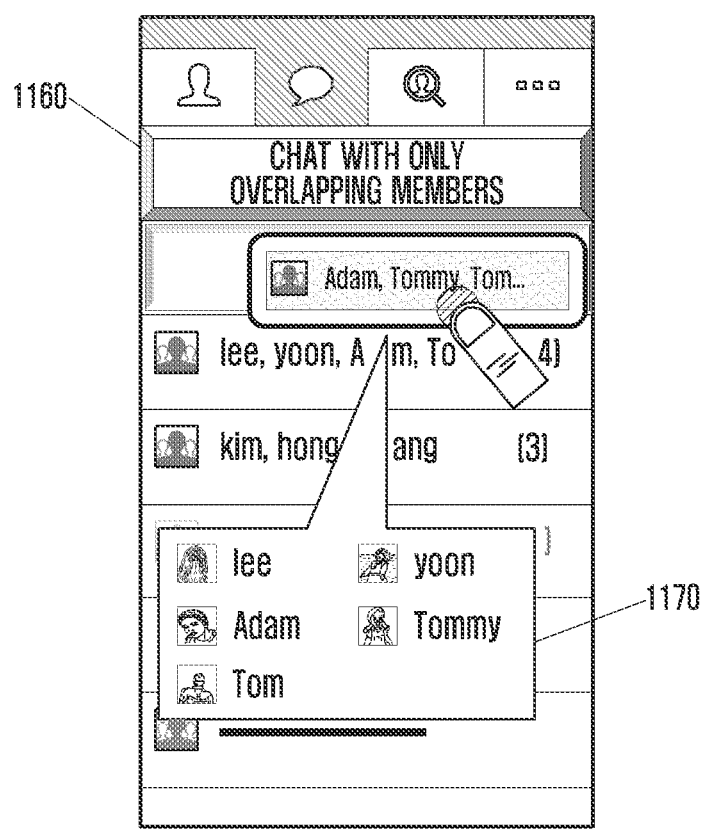
Figure 11C:
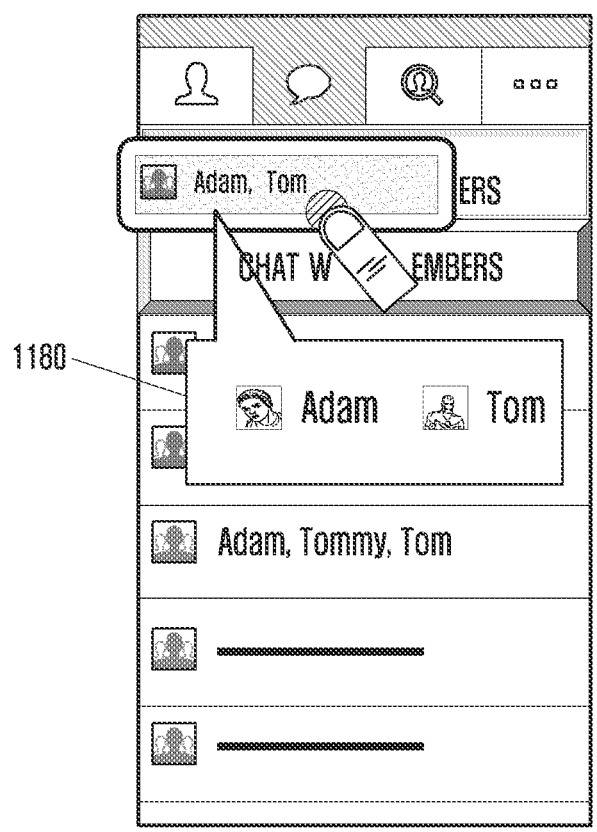

FIGS. 11A, 11B, and 11C illustrate a communication group generating screen according to various embodiments of the present disclosure.

Referring to FIGS. 11A, 11B, and 11C, when a group generation event is generated according to selection of two chatting room items 1120 and 1140 in a chatting room list screen 1110, the electronic device according to various embodiments of the present disclosure may support the output of member information corresponding to a group mode. The electronic device may output a member display window displaying member information on a communication list screen, but the present disclosure is not limited thereto.

As indicated in FIG. 11A, after selecting two or more chatting room items 1120 and 1140 to be used, the electronic device may move the selected chatting room items 1120 and 1140 to a group mode item. For example, the electronic device may move a movement object 1130 linked with the first chatting room item 1120 to the group mode item. The electronic device may output member information of a group chatting room to be generated according to the selected group mode based on movement of the movement object. For example, when the movement object moves to a union item 1150 (for example, chatting with all members), the electronic device may output union member information 1170 between the first chatting room item 1120 and the second chatting room item 1140 as indicated in FIG. 11B. Alternatively, when the movement object moves to an intersection item 1160 (for example, chatting with only overlapping members), the electronic device may output intersection member information 1180 between the first chatting room item 1120 and the second chatting room item 1140 as indicated in FIG. 11C.

FIGS. 12A, 12B, 12C, 12D, and 12E illustrate a communication group generating screen according to various embodiments of the present disclosure.

Referring to FIGS. 12A, 12B, 12C, 12D, and 12E, the electronic device according to various embodiments of the present disclosure may support a function of adding or excluding members of a communication group to be generated according to a touch movement in a state where two or more communication items are selected.

Figure 12A:
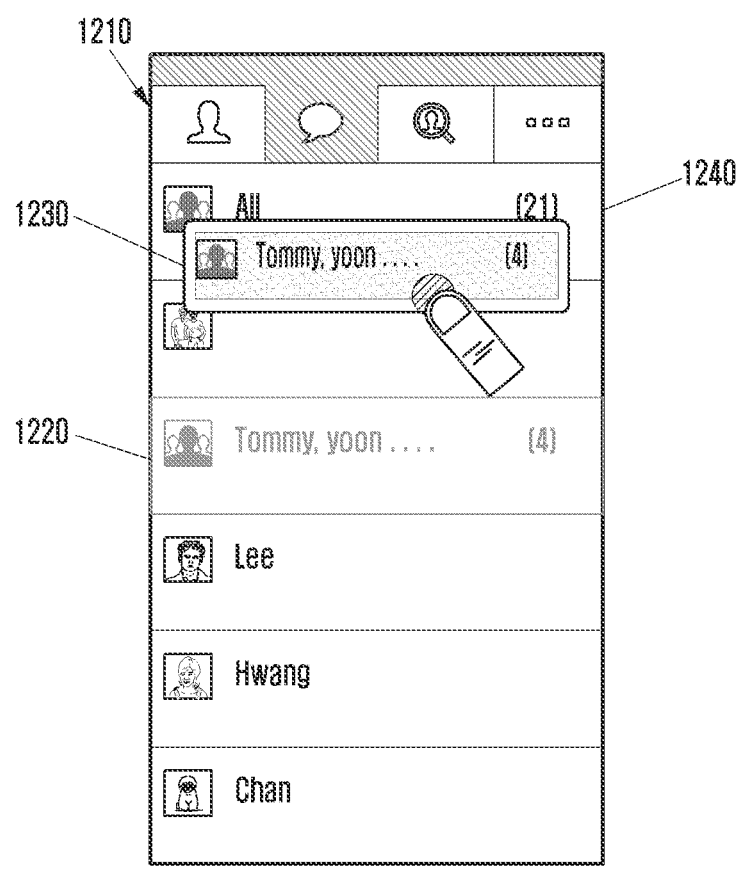
FIGS. 12A, 12B, 12C, 12D, and 12E illustrate a communication group generating screen according to various embodiments of the present disclosure.

When a group generation event is generated in a chatting list screen 1210 according to a user control input, the electronic device may select two or more chatting room items 1220 and 1240 as indicated in FIG. 12A. For example, the user may move a movement object 1230 corresponding to the first chatting room item 1220 to superpose the movement object 1230 onto the second chatting room item 1240.

Figure 12B:
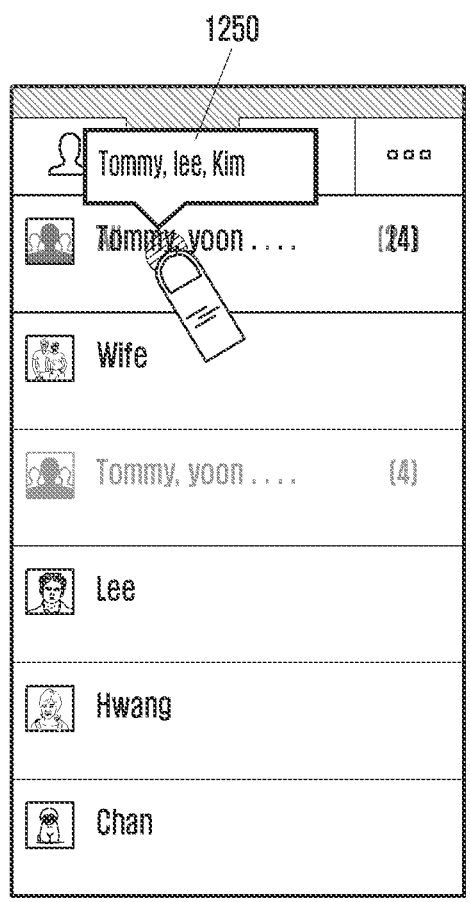

When the two or more chatting room items 1220 and 1240 are selected to generate a group, the electronic device may output member information corresponding to the selected group mode. For example, when an input for generating an intersection communication group is detected, the electronic device may output member information 1250 (for example, Tommy, Lee, Kim, and the like) of an intersection mode between the first chatting room item 1220 and the second chatting room item 1240 as indicated in FIG. 12B.

Figure 12C:
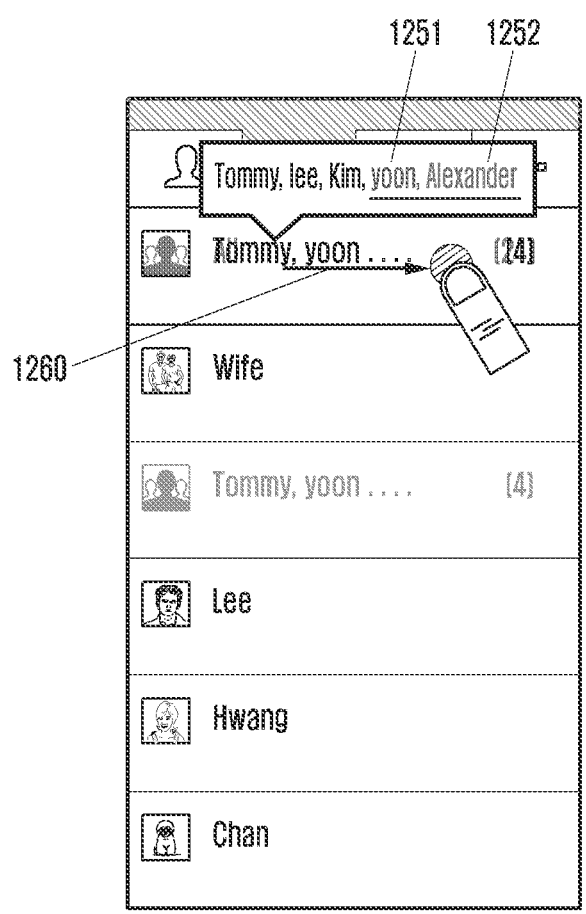

The user may move a finger in a certain direction 1260 (for example, a right direction) in a state where the member information 1250 is output as indicated in FIG. 12C. The electronic device may detect movement of the user input in a certain direction.

When the user's finger moves by a certain distance, the electronic device may add other members, which are not included in the members of the intersection mode, to the member information 1250. Added members may be selected based on at least one of alphabetical order, ranks according to frequency of communication logs, and arrangement order of friend list favorites. The arrangement order may be sequential or random. Alternatively, the added member may be selected first from members included in one chatting room item with a smaller number of members among two or more chatting room items.

For example, the user may sequentially add members of Yoon 1251 and Alexander 1252 to a window of the member information 1250 through a user input 1260 as indicated in FIG. 12C.

Figure 12D:
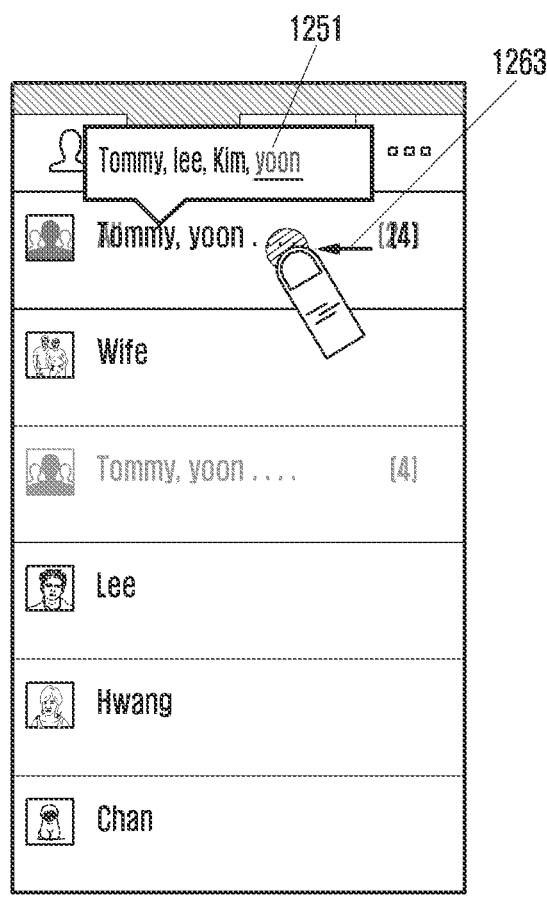

According to an embodiment of the present disclosure, the user may exclude a member from the communication group. When the user desires to exclude Alexander 1252 from the communication group, the member may be excluded through a user input 1260 as indicated in FIG. 12D. For example, a user input may be made in a direction 1263 opposite to a member addition direction. Thereafter, the electronic device may detect the user input and exclude the last member that is added (for example, Alexander 1252) from the member information in response to the user input.

Figure 12E:
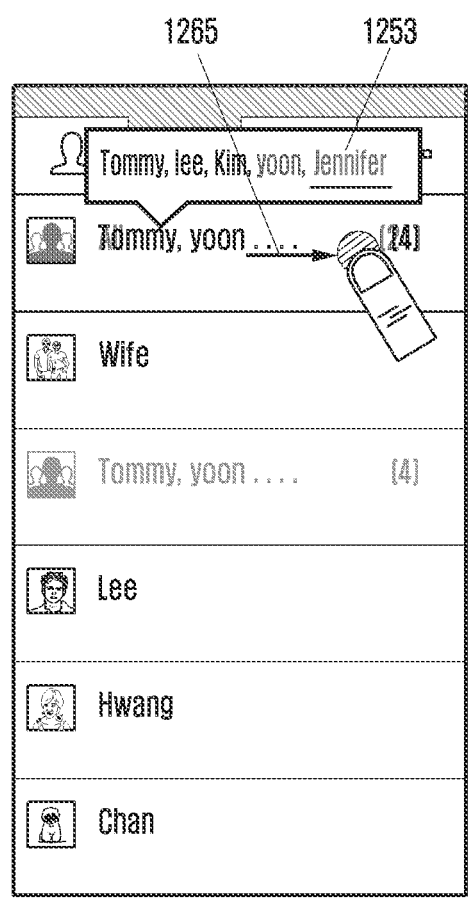

Subsequently, in order to add another member after the member that was excluded from the communication group (for example, Alexander 1252), the user may make a user input 1265. For example, the user input 1265 may be made in the direction of the member addition. In response to the user input 1265, the electronic device may exclude Alexander 1252 (in FIG. 12C) and add a new member of Jennifer 1253 to the group chatting room as indicated in FIG. 12E.

Figure 13:
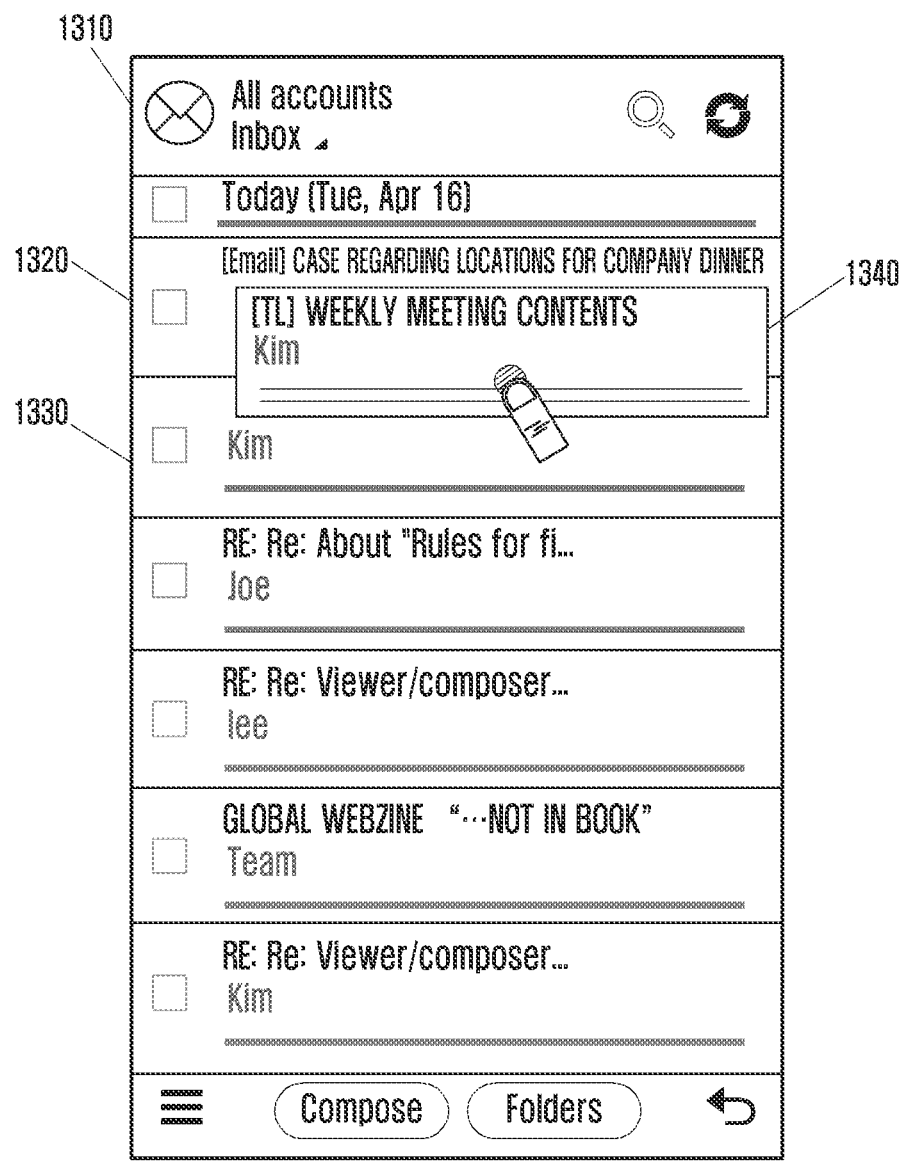
FIG. 13 illustrates a communication list operating screen according to various embodiments of the present disclosure.

FIG. 13 illustrates a communication list operating screen according to various embodiments of the present disclosure.

Referring to FIG. 13, various embodiments of the present disclosure may be applied to a communication list screen including one or more members, such as an address book list, a message list, a note list, a call list, an email list, and the like, as well as a chatting room list screen.

According to an embodiment of the present disclosure, the electronic device may output an email list screen 1310 according to a user request or a certain schedule. The user may generate an input signal for generating a group by selecting two or more email items 1320 and 1330 from the email list screen to generate a communication group. For example, the user may move a movement object 1340 corresponding to the first email item 1320 to superpose the movement object 1340 onto the second email item 1330. Thereafter, the electronic device may determine a group mode according to an overlapping area between the movement object 1340 and the second email item 1330, and may generate a new email group by selecting member information of the first email item 1320 and the second email item 1330 according to the determined group mode.

The email item may include various pieces of user information. For example, the email item may include information on a sender, a receiver, a cc, a bcc, and the like. The electronic device may compare user information included in two or more email items to generate a mail group of intersection members or a mail group of union members.

According to another embodiment of the present disclosure, the electronic device may generate a new note group by selecting two or more note items in a note list screen. Furthermore, when a group call is made in a call log screen, the electronic device may select two or more group call items and generate a call group of intersection members of a call group of union members by using information on members included in the group call.

The term "module" used in the present disclosure may refer to, for example, a unit including one or more combinations of hardware, software, and firmware. The "module" may be interchangeable with a term, such as a unit, a logic, a logical block, a component, a circuit, and the like. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific IC (ASIC) chip, a Field-Programmable Gate Arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a non-transitory computer-readable storage medium in a programming module form. When the command is executed by one or more processors (for example, the processor 210), the one or more processors may execute a function corresponding to the command. The non-transitory computer-readable storage medium may be, for example, the memory 220. At least a part of the programming module may be implemented (for example, executed) by, for example, the processor 210. At least some of the programming modules may include, for example, a module, a program, a routine, a set of instructions, or a process for performing one or more functions.

The non-transitory computer-readable recording medium may include magnetic media, such as a hard disk, a floppy disk, and a magnetic tape, an optical media, such as a Compact Disc ROM (CD-ROM) and a DVD, magneto-optical media, such as a floptical disk, and hardware devices specially configured to store and perform a program instruction (for example, programming module), such as a ROM, a RAM, a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a non-transitory computer-readable storage medium for storing a program for executing commands is provided.

When the commands are executed by one or more processors, the commands are configured to allow the one or more processors to perform one or more operations. The one or more operations include an operation for displaying a plurality of communication items generated based on a communication between a user and each of the communication groups including one or more members, an operation for selecting at least a first communication item and a second communication item from the plurality of communication items based on a first user selection, an operation for selecting at least one group mode from a plurality of group modes based on a second user selection, and an operation for generating a third group based on the group mode, a first communication group corresponding to the first communication item, and a second communication group corresponding to the second communication item.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of generating a communication group, the method comprising:
   displaying a plurality of communication items corresponding to a plurality of communication groups, each of the communication groups includes at least one member;
   selecting at least a first communication item corresponding to a first communication group and a second communication item corresponding to a second communication group from the plurality of communication items based on a first user selection;
   selecting a group mode from a plurality of group modes based on a second user selection; and
   generating a third communication group including at least one of the at least one member of the first communication group or the at least one member of the second communication group based on the selected group mode,
   wherein the plurality of group modes comprise at least a first group mode and a second group mode, and
   wherein the generating of the third communication group comprises:
      generating the third communication group such that the third communication group includes members included in both the first communication group and the second communication group in the first group mode; and
      generating the third communication group such that the third communication group includes members included in at least one of the first communication group or the second communication group in the second group mode.

2. The method of claim 1, wherein the displaying of the plurality of communication items comprises displaying at least one of a chatting room list screen, an address book list screen, a message list screen, a note list screen, a call log screen, or an email list screen.

3. The method of claim 1, wherein the selecting of the at least one of the first communication item or the second communication item comprises:
   selecting the first communication group corresponding to the first communication item among the communication items; and
   selecting the second communication group based on movement of the first communication group and an overlapping area between the first communication group and another communication group.

4. The method of claim 3, wherein the selecting of the at least one of the first communication item or the second communication item comprises displaying the selected communication item with at least one of a shape, size, color, or effect different from that of another communication item.

5. The method of claim 3, wherein the selecting of at least the first communication item and the second communication item comprises at least one of:
   when an overlapping area between a movement object of the first communication group corresponding to the first communication item and the second communication group corresponding to the second communication item is within a range, selecting information on intersection members between the selected first communication group and second communication group; or
   when the overlapping area between the movement object and the second communication group exceeds the range, selecting information on union members including all members of the first communication group and the second communication group.

6. The method of claim 3, wherein the selecting of the second communication item comprises determining priorities of communication groups corresponding to communication items which overlap the movement object based on movement of the movement object of the first communication group corresponding to the first communication item and selecting the second communication group corresponding to the second communication item.

7. The method of claim 1, wherein the selecting of the at least one of the first communication item or the second communication item further comprises:
   outputting a movement object linked with a communication group selected by an input for selecting the first communication group corresponding to the first communication item or the second communication group corresponding to the second communication item; and
   displaying a group mode item including at least one of an intersection item or a union item,
   wherein the generating of the third communication group comprises generating at least one of an intersection group or a union group based on the selected group mode item.

8. The method of claim 7, wherein the displaying of the group mode item comprises at least one of:
   displaying the group mode item such that the group mode item is superposed onto communication groups other than the first communication group corresponding to the first communication item; or
   displaying the group mode item on the communication groups.

9. The method of claim 1, wherein the selecting of the group mode comprises:
   recognizing movement of a first input for selecting the first communication group corresponding to the first communication item;
   outputting at least one group mode item on the second communication group corresponding to the second communication item based on the first input; and
   when the first input is released in a state where the group mode item is output, selecting a group mode corresponding to the output group mode item or a group mode item of a position where the first input is released.

10. The method of claim 1, wherein the selecting of at least the first communication item and the second communication item comprises:
recognizing multiple inputs for selecting at least two communication groups corresponding to the communication items, and
the recognizing of the multiple inputs comprises:
selecting a group mode according to movement of the multiple inputs; and
selecting members of the at least two communication groups selected by the multiple inputs according to the selected group mode.

11. The method of claim 1, wherein the generating of the third communication group comprises displaying information on members selected according to the group mode.

12. The method of claim 11, wherein the displaying of the information on the members further comprises:
recognizing movement of the user input; and
adding or excluding members included in the communication group according to a direction of the recognized movement.

13. An electronic device comprising:
a communication device configured to support an operation of a communication function;
a display configured to display a plurality of communication items corresponding to a plurality of communication groups, each of the communication groups including at least one member; and
a processor configured to:
detect a first user selection for selecting a first communication item corresponding to a first communication group and a second communication item corresponding to a second communication group from the plurality of communication items,
detect a second user selection for selecting a group mode from a plurality of group modes, and
control generation of a third communication group including at least one of the at least one member of the first communication group or the at least one member of the second communication group based on the selected group mode,
wherein the display is further configured to display at least one communication list screen among a chatting room list screen, an address book list screen, a message list screen, a note list screen, a call log screen, and an email list screen.

14. The electronic device of claim 13, wherein the processor is further configured to output a movement object linked with the first communication group corresponding to the first communication item based on the first user selection and selects the second communication group based on a movement direction of the movement object and an overlapping area between the movement object and at least the other communication group.

15. The electronic device of claim 14, wherein the processor is further configured to display the selected communication item with at least one of a shape, size, color, or effect different from that of another communication item.

16. The electronic device of claim 14, wherein the processor is further configured to:
select information on intersection members between the selected first communication group and the second communication group when an overlapping area between a movement object of the first communication group corresponding to the first communication item and the second communication group corresponding to the second communication item is within a range, and
select information on union members including all members of the first communication group and the second communication group when the overlapping area between the movement object and the second communication group exceeds the range.

17. The electronic device of claim 14, wherein, based on the movement object of the first communication group corresponding to the first communication item, the processor is further configured to:
determine priorities of communication groups corresponding to communication items which overlap the movement object, and
select the second communication group corresponding to the second communication item.

18. The electronic device of claim 13, the processor is further configured to:
recognize a movement of a first input for selecting the first communication group corresponding to the first communication item,
output at least one group mode item on the second communication group corresponding to the second communication item based on the first input, and
when the first input is released in a state where the group mode item is output, select a group mode corresponding to the output group mode item or a group mode item of a position where the first input is released.

19. The electronic device of claim 13, wherein the processor is further configured to:
recognize multiple inputs for selecting at least two communication groups corresponding to the communication items,
select a group mode according to movement of the multiple inputs, and
select members of the at least two communication groups selected by the multiple inputs according to the selected group mode.

20. The electronic device of claim 13, wherein the processor makes a control to further display information on members selected according to the group mode.

21. The electronic device of claim 20, wherein the processor is further configured to:
recognize a movement of an input for selecting the communication item, and
add or exclude members included in the communication group according to a direction of the recognized movement.

22. A non-transitory computer-readable recording medium for storing a program for performing the operations of:
displaying a plurality of communication items corresponding to a plurality of communication groups, each of the communication groups including at least one member;
selecting at least a first communication item corresponding to a first communication group and a second communication item corresponding to a second communication group from the plurality of communication items based on a first selection by the user;
selecting at least one group mode from a plurality of group modes based on a second selection by the user; and
generating a third communication group including at least one of the at least one member of the first communication group or the at least one member of the second communication group based on the selected group mode, wherein the plurality of group modes comprise at least a first group mode and a second group mode, and wherein the generating of the third communication group comprises:
    generating the third communication group such that the third communication group includes members included in both the first communication group and the second communication group in the first group mode; and
generating the third communication group such that the third communication group includes members included in at least one of the first communication group or the second communication group in the second group mode.

* * * * *